(12) United States Patent
Toews et al.

(10) Patent No.: US 12,474,089 B2
(45) Date of Patent: Nov. 18, 2025

(54) GENERATING GEOTHERMAL ENERGY USING MULTIPLE WORKING FLUIDS

(71) Applicants: Eavor Technologies Inc., Calgary (CA); Matthew Toews, Calgary (CA); Bailey Schwarz, Calgary (CA); John Redfern, Los Angeles, CA (US); Paul Cairns, Calgary (CA); Vsevolod Zatonski, Calgary (CA)

(72) Inventors: Matthew Toews, Calgary (CA); Bailey Schwarz, Calgary (CA); John Redfern, Los Angeles, CA (US); Paul Cairns, Calgary (CA); Vsevolod Zatonski, Calgary (CA)

(73) Assignee: Eavor Technologies Inc.

( * ) Notice: Subject to any disclaimer, the term of this patent is extended or adjusted under 35 U.S.C. 154(b) by 383 days.

(21) Appl. No.: 18/019,645

(22) PCT Filed: Aug. 5, 2021

(86) PCT No.: PCT/IB2021/057233
§ 371 (c)(1),
(2) Date: Feb. 3, 2023

(87) PCT Pub. No.: WO2022/029699
PCT Pub. Date: Feb. 10, 2022

(65) Prior Publication Data
US 2023/0288099 A1    Sep. 14, 2023

Related U.S. Application Data

(60) Provisional application No. 63/061,385, filed on Aug. 5, 2020.

(51) Int. Cl.
*F24T 10/10*    (2018.01)
*F24T 10/17*    (2018.01)
(Continued)

(52) U.S. Cl.
CPC .............. *F24T 10/10* (2018.05); *F24T 10/17* (2018.05); *F24T 10/30* (2018.05); *F24T 10/40* (2018.05);
(Continued)

(58) Field of Classification Search
CPC . F24T 10/10; F24T 10/17; F24T 10/20; F24T 10/30; F24T 10/40; F24T 50/00;
(Continued)

(56) References Cited

U.S. PATENT DOCUMENTS 5,515,679 A * 5/1996 Shulman ................. F03G 4/074
165/45
5,992,507 A    11/1999 Peterson et al.
(Continued)

FOREIGN PATENT DOCUMENTS

JP    58-047960    3/1983
WO    WO 2004/064221    7/2004
(Continued)

OTHER PUBLICATIONS

International Preliminary Report on Patentability in International Appln. No. PCT/IB2021/057233, mailed on Feb. 16, 2023, 7 pages.
(Continued)

*Primary Examiner* — Eric S Ruppert
*Assistant Examiner* — Hans R Weiland
(74) *Attorney, Agent, or Firm* — Fish & Richardson P.C.

(57) ABSTRACT

A method includes flowing, in a closed loop geothermal well residing in a target subterranean zone, a first heat transfer working fluid and flowing, in the geothermal well, a second working fluid from the surface inlet to the downhole location of the geothermal well. The second working fluid resides upstream of the first heat transfer working fluid. The second working fluid includes a fluid density greater than a fluid density of the first heat transfer working fluid. The method
(Continued)

also includes circulating, in the geothermal well, the second working fluid pushing, with the second working fluid, the first heat transfer working fluid toward a surface outlet of the geothermal well. The method also includes collecting energy from the mobilized first heat transfer working fluid received at the surface outlet of the geothermal well.

24 Claims, 13 Drawing Sheets

(51) Int. Cl.
| | |
|---|---|
| *F24T 10/30* | (2018.01) |
| *F24T 10/40* | (2018.01) |
| *F28D 20/00* | (2006.01) |
| *H02J 3/28* | (2006.01) |
| *H02J 15/00* | (2006.01) |
| *F24T 50/00* | (2018.01) |

(52) U.S. Cl.
CPC ............ *F28D 20/0052* (2013.01); *H02J 3/28* (2013.01); *H02J 15/00* (2013.01); *F24T 50/00* (2018.05)

(58) Field of Classification Search
CPC ......... F28D 20/0052; H02J 3/28; H02J 15/00; Y02E 10/10
See application file for complete search history.

(56) References Cited

U.S. PATENT DOCUMENTS

| | | | | |
|---|---|---|---|---|
| 6,668,554 | B1* | 12/2003 | Brown | .................... F24T 10/20 |
| | | | | 60/641.2 |
| 7,320,221 | B2 | 1/2008 | Bronicki | |
| 8,281,591 | B2 | 10/2012 | Lakic | |
| 10,527,026 | B2* | 1/2020 | Muir | ......................... F03G 7/04 |
| 2007/0245729 | A1* | 10/2007 | Mickleson | ............ F01K 25/106 |
| | | | | 60/641.2 |
| 2009/0320475 | A1 | 12/2009 | Parrella | |
| 2011/0048005 | A1* | 3/2011 | McHargue | .............. F24T 10/10 |
| | | | | 165/45 |
| 2012/0174581 | A1* | 7/2012 | Vaughan | .................. F24T 10/10 |
| | | | | 290/40 C |
| 2015/0300327 | A1 | 10/2015 | Sweatman et al. | |
| 2020/0011151 | A1* | 1/2020 | Toews | ..................... F24T 10/10 |
| 2024/0035710 | A1* | 2/2024 | Toews | ................... E21B 43/305 |

FOREIGN PATENT DOCUMENTS

| | | |
|---|---|---|
| WO | WO 2019/157341 | 8/2019 |
| WO | WO 2019/246369 | 12/2019 |
| WO | WO 2020/006620 | 1/2020 |
| WO | WO 2020/153896 | 7/2020 |

OTHER PUBLICATIONS

International Search Report and Written Opinion in International Appln. No. PCT/IB2021/057233, mailed on Nov. 3, 2021, 9 pages.
Logan et al., "Electricity Generation Baseline Report," National Renewable Energy Laboratory, Jan. 2017, 289 pages.
Ruoso et al., "Storage Gravitational Energy for Small Scale Industrial and Residential Applications," Inventions, Oct. 31, 2019, 13 pages.
SBIR.gov [online], "Thermal energy storage for dispatchable geothermal power," Jul. 2, 2018, retrieved on Jun. 27, 2023, retrieved from URL<https://www.sbir.gov/sbirsearch/detail/1523867>, 1 page.
Wikipedia.org [online], "Duck curve," available on or before Apr. 2, 2023, retrieved on Jun. 27, 2023, retrieved from URL<https://en.wikipedia.org/wiki/Duck_curve>, 4 pages.
Office Action in Japanese Appln. No. 2023-507796, mailed on May 27, 2024, 11 pages (with Machine translation).
Extended European Search Report in European Appln. No. 21854449.2, mailed on Jun. 28, 2024, 6 pages.
Office Action in India Appln. No. 202327007030, mailed on Oct. 3, 2023, 8 pages (with English translation).

* cited by examiner

GENERATING GEOTHERMAL ENERGY USING MULTIPLE WORKING FLUIDS

CROSS-REFERENCE TO RELATED APPLICATIONS

This application is a national phase entry under 35 U.S.C. § 371 of PCT Application Serial Number PCT/IB2021/057233, filed on Aug. 5, 2021, which claims priority to U.S. Provisional Application Ser. No. 63/061,385, filed on Aug. 5, 2020. The entirety of these prior applications is incorporated herein by reference.

FIELD OF THE DISCLOSURE

This disclosure relates to energy storage and production, in particular, to energy storage and production using geothermal energy recovery systems and methods.

BACKGROUND

Geothermal energy is a form of thermal energy that uses the natural heat of the Earth. Geothermal energy is a source of renewable energy and is not an intermittent source of energy like solar and wind, which depend on the sun or wind to generate electricity. There is a growing need for dispatchable sources of renewable energy and energy storage solutions. Methods and equipment for generating dispatchable and reliable renewable energy are continuously sought.

SUMMARY

Implementations of the present disclosure include a method that includes flowing, in a closed loop geothermal well residing in a target subterranean zone, a first heat transfer working fluid from a surface inlet of the geothermal well to a downhole location of the geothermal well. The method also includes flowing, in the geothermal well, a second working fluid from the surface inlet to the downhole location of the geothermal well. The second working fluid resides upstream of the first heat transfer working fluid. The second working fluid includes a fluid density greater than a fluid density of the first heat transfer working fluid. The method also includes circulating, in the geothermal well, the second working fluid pushing, with the second working fluid, the first heat transfer working fluid toward a surface outlet of the geothermal well. The method also includes collecting energy from the mobilized first heat transfer working fluid received at the surface outlet of the geothermal well.

In some implementations, the geothermal well includes: (i) a surface inlet wellbore extending from the surface inlet to the target subterranean zone, (ii) a surface outlet wellbore extending from the surface outlet to the target subterranean zone, and (iii) a deviated wellbore fluidly coupled to and interconnecting the surface inlet wellbore to the surface outlet wellbore. The deviated wellbore resides in the target subterranean zone, and circulating the second working fluid includes flowing the second working fluid from the surface inlet wellbore to the deviated wellbore and from the deviated wellbore to the surface outlet wellbore, pushing the first heat transfer working fluid from the deviated wellbore to the surface outlet of the geothermal well.

In some implementations, the second working fluid includes a thermal expansion coefficient equal to or greater than a thermal expansion coefficient of the first fluid. In such cases, flowing the second working fluid includes flowing the second working fluid in the geothermal well such that the second working fluid expands, when absorbing heat from the target subterranean zone, in the geothermal well to increase a flow rate of the first heat transfer working fluid at the surface outlet of the geothermal well.

In some implementations, the first heat transfer working fluid is water and the second working fluid includes a thermal expansion coefficient that is one or more orders of magnitude greater than the thermal expansion coefficient of water.

In some implementations, the geothermal well further includes multiple deviated wellbores fluidly coupled to and extending from a common downhole end of the surface inlet wellbore to a common downhole end of the surface outlet wellbore. Each of the plurality of deviated wellbores resides in the target subterranean zone and each includes: (i) a first lateral wellbore extending from the downhole end of the surface inlet wellbore to a downhole junction, and (ii) a second lateral wellbore extending from the downhole end of the surface outlet wellbore to the downhole junction. In such cases, circulating the second working fluid includes flowing the second working fluid from the surface inlet to the downhole junction and from the downhole junction to the surface outlet.

In some implementations, the respective first lateral wellbores reside above the respective second lateral wellbores. Each of the respective first and second lateral wellbores are slanted such that the downhole junction resides at a depth greater than a depth of the downhole end of the surface inlet wellbore.

In some implementations, the method also includes, after flowing the second working fluid, flowing, in the closed loop geothermal well, a third heat transfer working fluid from the surface inlet to the downhole location and with the third heat transfer working fluid residing upstream of the second working fluid. The third heat transfer working fluid includes a fluid density greater than the fluid density of the first heat transfer working fluid. The method also includes circulating, in the closed loop geothermal well, the third heat transfer working fluid pushing, with the third heat transfer working fluid, the second and first heat transfer working fluids toward the surface outlet of the closed loop geothermal well.

In some implementations, the closed loop geothermal well includes a controller electrically coupled a pump configured to circulated the first and second working fluids in the geothermal well. The controller is configured to change, based on an energy demand of an electrical grid associated with an intermittent energy source, a flow rate of the pump, changing a flow rate of the first and second working between a charging cycle that includes lifting the second working fluid from a downhole location of the geothermal well to a surface of the geothermal well, and a discharging cycle that includes circulating the second working fluid in the geothermal well, pushing the first heat transfer working fluid toward the surface outlet of the geothermal well to collect energy from the first heat transfer working fluid.

In some implementations, the pump is powered by the intermittent energy source and the controller is configured to initiate the charging cycle when the intermittent energy source meets or exceeds an energy demand of the electrical grid. In such cases, the controller is configured to supply, during the discharging cycle, the collected energy to the electrical grid to supplement an energy output of the intermittent energy source. The controller is also configured to initiate the discharging cycle when the intermittent energy source does not meet the energy demand of the electrical grid.

In some implementations, supplementing the energy output of intermittent energy source includes producing, together with the intermittent energy source, a dispatchable energy output for the electrical grid.

In some implementations, circulating the second working fluid includes recovering, with the first and second working fluids, heat energy from the target subterranean zone, and collecting energy includes generating at least one of hydraulic energy, thermal energy, or mechanical energy from the mobilized first heat transfer working fluid.

In some implementations, the method also includes changing, at a surface of the closed loop geothermal well, at least one of a temperature, a residency time, or a fluid density of at least one of the first heat transfer working fluid or the second working fluid to change a specified energy output of the first heat transfer working fluid at the surface outlet.

In some implementations, changing the residency time includes changing a flow rate of the second working fluid to change a time it takes the second working fluid to flow from the surface inlet to the surface outlet such that the second working fluid pushes the first heat transfer working fluid to the surface outlet during a discharging cycle based on a low energy output of an intermittent energy source associated with the geothermal well, and the second working fluid is lifted to the surface outlet by a pump powered by the intermittent energy source during a charging cycle based on a high energy output of the intermittent energy source associated with the geothermal well.

In some implementations, the first heat transfer working fluid is immiscible with the second working fluid or the geothermal well includes an immiscible pill disposed between and immiscible with the first heat transfer working fluid and the second working fluid.

In some implementations, the closed loop geothermal well includes at least one of an L shaped wellbore, a U shaped wellbore, or a single wellbore. The L shaped wellbore includes a surface directional inlet wellbore and a surface directional outlet wellbore. The surface directional inlet wellbore includes a first heel and a first toe disposed in the subterranean zone and the surface directional outlet wellbore includes a second heel and a second toe. The second toe is fluidly coupled, at a common downhole joint of the geothermal well, to the first toe such that, in side view, the two directional wellbores form an L shaped wellbore. The U shaped wellbore includes a surface inlet wellbore extending from the surface inlet to the subterranean zone, a surface outlet wellbore spaced from the surface inlet wellbore and extending from the surface outlet to the subterranean zone, and an interconnecting wellbore extending between and fluidly coupled to the surface inlet and the surface outlet and forming, in side view with the surface inlet wellbore and the surface outlet wellbore, a U shaped wellbore. The single wellbore includes a wellbore string disposed within the single wellbore and defining an annulus with a wall of the single wellbore. The annulus defines the surface inlet and the wellbore string defines the surface outlet. In some implementations, the geothermal well is an L shaped wellbore, and the first and second heels are open hole and a section of each wellbore between the respective heel and the respective toe are open hole and include a substantially impermeable interface between each wellbore and the earth of the subterranean zone surrounding each wellbore.

In some implementations, the method also includes, before flowing the first heat transfer working fluid, flowing, in the geothermal well, a sealant in the closed loop geothermal well. The method also includes forming, by circulating the sealant in the geothermal well, a thermally conductive interface between the geothermal well and the earth at the subterranean zone surrounding the geothermal well. The thermally conductive interface is substantially impermeable to fluids while at least a portion of the wellbore is open hole. Circulating the second working fluid includes thermally charging the second working fluid through exposure, through the thermally conductive interface, to the target subterranean zone.

In some implementations, the system also includes multiple closed loop geothermal wells residing in the target subterranean zone or a different subterranean zone. Each of the plurality of closed loop geothermal wells includes a respective surface inlet and a respective surface outlet. The method also includes flowing, in each geothermal well, a respective first heat transfer working fluid from the surface inlet of each geothermal well to a downhole location of each geothermal well. The method also includes flowing, in each geothermal well, a respective second working fluid from the surface inlet of each geothermal well to a downhole location of each geothermal well. The respective second working fluid resides upstream of the respective first heat transfer working fluid. The respective second working fluid includes a fluid density greater than a fluid density of the respective first heat transfer working fluid. The method also includes circulating, in each geothermal well, the respective second working fluid pushing, with the respective second working fluid, the respective first heat transfer working fluid toward the surface outlet of each geothermal well. The method also includes collecting energy from the respective mobilized first heat transfer working fluid received at the surface outlet of each geothermal well.

In some implementations, collecting the energy includes collecting a selectively variable energy from each of the respective mobilized first heat transfer working fluids.

In some implementations, collecting energy includes amalgamating the collected energy from each of the respective mobilized first heat transfer working fluids to form an energy output of a predetermined quantity.

In some implementations, circulating the respective second working fluid of one of the plurality of geothermal wells includes circulating, with a pump powered with the collected energy of another of the plurality of geothermal wells, the respective second working fluid in the respective geothermal well.

Implementations of the present disclosure include a method of normalizing irregular electrical supply and demand from an electrical grid. The method can further include generating electrical energy from the collected energy and supplying the electrical grid with the generated electrical energy at a predetermined time to coincide with periods of increased demand on the grid.

Implementations of the present disclosure include a geothermal system that includes a closed loop geothermal well, a first heat transfer working fluid, and a second working fluid. The closed loop geothermal well includes a surface inlet wellbore, a surface outlet wellbore, and an interconnecting wellbore fluidly coupled to and interconnecting the surface inlet wellbore to the surface outlet wellbore. The interconnecting wellbore resides in a target geothermal subterranean zone. The first heat transfer working fluid resides inside and is configured to circulate in the geothermal well. The second working fluid is configured to circulate in the geothermal well from the surface inlet wellbore to the surface outlet wellbore. The second working fluid resides upstream of the first heat transfer working fluid and the second working fluid includes a fluid density greater than a fluid density of the first heat transfer working fluid. Circulating the second working fluid includes pushing, with the second working fluid, the first heat transfer working fluid toward a surface outlet of the surface outlet wellbore to collect energy from the mobilized first heat transfer working fluid received at the surface outlet.

Implementations of the present disclosure include a power production system that includes an electrical grid, an intermittent power production source electrically coupled to the electrical grid, a closed loop geothermal system, and a controller. The closed loop geothermal system is electrically coupled to the electrical grid and includes a geothermal well including a surface inlet and a surface outlet. The heat exchanger is fluidly coupled to the surface outlet and is electrically coupled to the electrical grid. The heat exchanger is configured to output electricity generated by movement of a first heat transfer working fluid pushed by a second working fluid circulated, in the geothermal well, downhole to convert a gravitational potential energy of the second working fluid into kinetic energy of the first heat transfer working fluid. The second working fluid has density that is greater than the first heat transfer working fluid. The second working fluid resides upstream of the first heat transfer working fluid. The controller is operatively coupled to the electrical grid, the intermittent power production source, and the closed loop geothermal system. The controller determines, based on a power output of the intermittent power production source, a power requirement of the electrical grid for a selected period of time and is configured to switch the closed loop geothermal system between charging cycles and discharging cycles to provide, together with the intermittent power production source, a dispatchable energy output to the electrical grid.

Implementations of the present disclosure include receiving, by a controller and from a power distributor, energy demand information. The method also includes controlling, by the controller and based on the energy output requirement, at least one of a valve or a pump of the closed loop geothermal well to flow the second working fluid in a downhole direction of the closed loop geothermal well, pushing, with the second working fluid, the first heat transfer working fluid toward and through the energy conversion facility. The method also includes controlling, by the controller, the energy conversion facility to collect energy from the mobilized first heat transfer working fluid received at the surface outlet of the closed loop geothermal well to the power distribution unit.

Implementations of the present disclosure provide an energy formation method that includes using a geothermal well. The method includes: providing a fluid composition having a first fluid density and a second fluid density greater than the first fluid density for circulation within a loop; generating a hydrostatic head differential between the fluid having a first fluid density and the fluid having a second fluid density; mobilizing the fluid having the first fluid density by discharging potential energy of the fluid having the second fluid density; and collecting energy created from the mobilized fluid.

In some implementations, the density of the fluid may be dynamically changed during operation, which can increase the efficiency of the system. Further, the flow rate and volume of the fluid having a first fluid density and the fluid having a second fluid density may be varied as well as the residency time in the loop. Density may also be altered by introduction of time release compositions.

In some implementations, the collected energy may be converted into at least one of electrical energy, mechanical energy and thermal energy and this optionally used to supplement an intermittent energy source, an electrical grid source and/or a geothermal energy source.

In some implementations, when acting as an adjunct to the additional energy sources, varying at least one of density, flow rate, residency time, temperature, volume and combinations thereof of the fluid may be conducted to provide a synthesized energy output profile from collected energy.

In some implementations, the first fluid or the second fluid is configured to be a supercritical fluid in the geothermal well.

Implementation of the present disclosure also include a gravitational energy production method, including: providing a closed loop having an inlet, an outlet and an energy conversion device operatively connected to the closed loop; providing a fluid composition having a first fluid density and a second fluid density greater than the first fluid density for circulation within the loop; increasing gravitational potential energy of the fluid having the second fluid density by increasing its elevation; mobilizing the fluid having the first density by discharging potential energy of the fluid having the second fluid density; and selectively forming energy through contact of mobilized fluids in the energy conversion device.

In some implementations, the fluid having a first fluid density and a second fluid density may be formed from a single fluid. In some implementations, at least two fluids each having a different density can be used.

In some implementations, the method also includes increasing said gravitational energy by at least one of thermal, electrical, mechanical energy and combinations thereof. The fluids having the increased potential energy may be stored and the method conducted in a thermally productive geologic formation.

In some implementations, a void or wellbore portion may be included in the formation in selective fluid communication with the closed loop or positioned adjacent the closed loop for selective indirect thermal exchange and combinations thereof.

In some implementations, the gravitational potential energy of at least one of the fluids is increased through thermal transfer to the at least one of the fluids from recovered thermal energy from said conduit. The thermal transfer to the at least one of the fluids drives a thermosiphon, which raises the at least one of the fluids toward the surface.

In some implementations, the method also includes converting, in said conversion device, gravitational potential energy of said fluid having a second fluid density to electrical energy from mobilized liquid having a first fluid density imparted from said fluid having a second fluid density.

In some implementations, for increased efficiency, the liquids may be conditioned to enhance heat capacity and recovery of thermal energy from the formation.

In some implementations, if there is a possible issue of miscibility or mixing of the liquids, an interface may be utilized between the liquid of the first density and the liquid of the second density within the loop to prevent mixing.

Implementations of the preset disclosure also include an energy formation method that includes: providing a fluid composition having a first fluid density and a second fluid density greater than the first fluid density for circulation within a plurality of loops, each loop of the loops having a different fluid composition; generating a hydrostatic head differential between the fluid having a first fluid density and the liquid having a second fluid density for each loop of the plurality of loops; mobilizing the fluid having the first fluid density by discharging potential energy of the fluid having the second fluid density for each loop of the plurality of loops; and amalgamating energy created from the mobilized fluids of the loops.

In some implementations, the energy created from each loop may be variable and may be selectively amalgamated to synthesize an energy output of a predetermined quantity over a predetermined time period.

In some implementations, sequencing at least one of timing, flow rate, volume, or routing of the different density fluids within different loops may be done to effect a superposition of net energy created from said loops of a predetermined quantity.

In some implementations, a quantum of energy created from the loops may be used to facilitate the hydrostatic head differential. Further, a quantum of energy from an intermittent energy source, electrical grid source and/or geothermal source integrated with the loops may be used to facilitate the hydrostatic head differential.

In some implementations, depending on the nature of the formation, positioning loops within the thermally productive formation may be effected in a predetermined quantity, pattern, or shape.

Implementations of the present disclosure also include a gravitational energy production method, including: providing a closed loop having an inlet, an outlet and an energy conversion device operative with the loop, at least a portion of the loop being disposed within a thermally productive formation having a predetermined potential thermal output capacity; providing a fluid having a first fluid density and a fluid having a second fluid density greater than the first fluid density adapted for circulation within the loop; thermally charging the fluids in the loop through exposure to the thermally productive formation; generating a hydrostatic head differential between the fluid having a first fluid density and the fluid having a second fluid density; mobilizing the fluid having the first fluid density by discharging potential energy of the thermally charged fluid; and forming energy through contact of mobilized fluid in the energy conversion device.

In some implementations, said loop is in a geothermal formation. In some implementations, the unit operations of sequencing, timing, flow rate, volume, routing, residency time and combinations thereof of the liquids within said loop may be at least partly based on formation rock type, formation rock properties and loop geometry. The operations may be adjusted said to oscillate thermal output about the predetermined potential thermal output capacity to produce on demand power, where an average thermal output is equal to the predetermined potential thermal output capacity.

In some implementations, the output may be controlled to produce baseload power or dispatchable output that is multiple of the baseload quantity.

In some implementations, the method also includes amalgamating a plurality of loop arrangements and commonly collecting formed energy.

In some implementations, the method also includes selecting unit operations including at least one of sequencing, timing, flow rate, volume, routing, residency time and combinations thereof of said liquids within each loop of said plurality of loops.

In some implementations, depending on the formation, the loop may be connected operatively to any pre-existing voids, conduits, openings, unused wells as a thermal repository to store thermally charged fluid for selective on demand use.

Implementations of the present disclosure also include a power production switching system for switching between charging cycles and discharging cycles, comprising at least one of: a pre-existing electrical grid power production source; an intermittent power production source; a hydrostatic head differential power production source operable by fluid density differential to effect movement of a fluid prime mover; or a combination thereof, each source being operatively connected for selective adjunct connection; and a controlling device operatively connected to the sources to determine power output requirement for a selected period of time and switch between charging cycles and discharging cycles of hydrostatic head differential power production source.

Implementations of the present disclosure also include a method for normalizing irregular electrical supply and demand from an electrical grid. The method can further include providing the formed electrical energy and supplying the electrical grid with the formed electrical energy at a predetermined time to coincide with periods of increased demand.

Implementations of the present disclosure also include a method for normalizing irregular supply and demand electrical supply from an electrical grid. The method can further include providing the formed electrical energy and supplying the electrical grid with the formed electrical energy at a predetermined time to coincide with periods of increased demand.

Implementations of the present disclosure also include providing a method for normalizing irregular supply and demand electrical supply from an electrical grid. The method can further include providing the formed electrical energy and supplying the electrical grid with the formed electrical energy at a predetermined time to coincide with periods of increased demand.

Particular implementations of the subject matter described in this specification can be implemented so as to realize one or more of the following advantages. For example, the output energy of the geothermal well can supplement an intermittent energy source, an electrical grid, or other geothermal wells during periods of high demand or other conditional or temporal irregularities. Optimization gravity storage in a geothermal well can be used to significantly offset the intermittency of solar and wind. The footprint of the geothermal wellbore can be relatively small, increasing its geographical applicability. The methods described herein can be utilized in existing wellbores without any or much modification.

DETAILED DESCRIPTION

The present disclosure describes the use of multiple fluids in a closed-loop geothermal well or conduit to increase the flow rate and/or the produced fluid pressure of one or more fluids and thus increase the energy output of the geothermal well. In certain instances, the fluids can have different densities and compositions. For example, a first fluid can be introduced in the geothermal well, and then a second, heavy fluid, denser than the first fluid, can be introduced in the geothermal well to push the first fluid through and out of the well (e.g., to the terranean surface). The circulation of the heavy fluid can be based on energy demand. For example, during periods of relatively low energy demand, the heavy fluid supplied into the well can be lifted by a pump to the terranean surface, storing energy in the heavy fluid (e.g., by using the energy of the pump to increase the height, relative to the bottom of the well, and thus the potential energy of the heavy fluid.) During periods of relatively high energy demand, the heavy fluid can be released to fall in the well, pushing the lighter fluid out of the well to collect energy from the mobilized lighter fluid.

To store energy or to increase the energy output of the well, the geothermal systems of the present disclosure can increase the potential energy of the heavy fluid with respect to the lighter fluid. For example, the system can increase the potential energy of the heavy fluid by further increasing the density of the heavy fluid or by lifting the heavy fluid to the surface and flowing the lighter fluid to a downhole location of the well. Thus, the system can increase a "differential hydrostatic head" between the two fluids to store energy in the system. In some implementations, differential hydrostatic head refers to the difference in elevation and density between the two fluids.

The growth of intermittent renewable energy sources in many countries has created an increasing demand for energy storage solutions. In some cases, to sustain an uninterrupted supply of energy in a grid system supplied by intermittent energy sources, large energy storage solutions are desirable to make up for periods in which intermittent energy sources cannot meet the energy demands of the grid. For example, energy storage solutions are desirable to supply energy during periods of no wind in the case of wind turbines or during the night in the case of solar panels. To provide an energy storage solution, the geothermal systems described in the present disclosure can provide a dispatchable energy output alone or in combination with intermittent energy sources.

Figure 1:
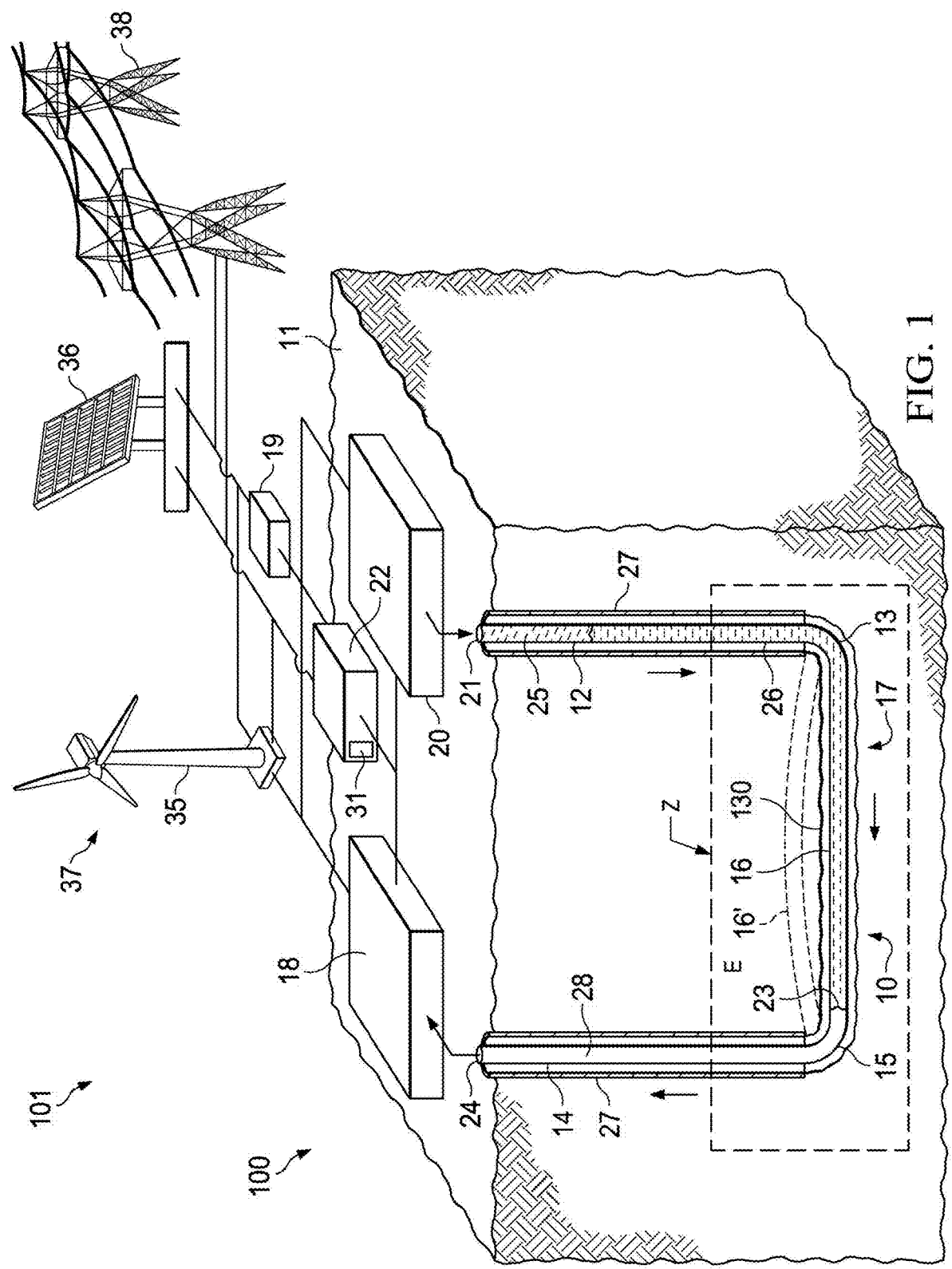
FIG. 1 is a perspective schematic view of a geothermal system according to a first implementation of the present disclosure.

FIG. 1 shows a geothermal system 100 that includes a closed loop geothermal well 10 and surface equipment that includes a pump 18, an energy collection facility 22, and a fluid handling facility 20. The geothermal well 10 is closed loop, meaning that the fluids in the well are not intended to leave the well and the fluids can circulate continuously between the well and the energy collection facility 22 at the terranean surface. The surface equipment can be arranged in different configurations. For example, the pump 18 can be at an inlet or an outlet of the well 10, and the energy collection facility 22 can be near the outlet of the well 10 to collect energy from the fluid directly exiting the well 10.

The geothermal well 10 is disposed in or extends through a target geothermal subterranean zone "Z." The target geothermal subterranean zone "Z" is a zone underneath the earth's surface 11 targeted for geothermal energy production. For example, such a zone is typically selected because of its thermal properties, e.g., its temperature and thermal gradient are suitable for geothermal energy production. The target geothermal subterranean zone "Z" can include one, a portion of one, or multiple thermally productive formations or subterranean layers. In some implementations, the well 10 can be a closed loop well that does not reside in a target geothermal subterranean zone.

The geothermal well 10 includes a surface inlet 21 and a surface outlet 24. The geothermal well 10 also includes a surface inlet wellbore 12, a surface outlet wellbore 14, and an interconnecting wellbore 16 fluidly coupled to and interconnecting the surface inlet wellbore 12 to the surface outlet wellbore 14. The surface inlet wellbore 12 extends from the surface inlet 21 to the target subterranean zone "Z." The surface outlet wellbore 14 extends from the surface outlet 24 to the target subterranean zone "Z." The interconnecting wellbore 16 resides in the subterranean zone "Z." The surface wellbores 12 and 14 can be existing wellbores (e.g., wellbores previously used for oil or gas production) or wellbores drilled for geothermal purposes.

In certain instances, the well 10 is a U shaped wellbore, as shown in FIG. 1, with the surface outlet wellbore 14 spaced from the surface inlet wellbore 12, and the interconnecting wellbore 16 extending between the surface inlet wellbore 12 and the surface outlet wellbore 14 to form, in side view, a U shaped well. Additionally, the well 10 can have a second interconnecting wellbore 16' or more than two interconnecting wellbores connecting the inlet wellbore 12 to the outlet wellbore 14.

In certain instances, the surface inlet wellbore 12 and the surface outlet wellbore 14 have a casing 27 and the interconnecting wellbore 16 is open hole. In certain instances, some or all of the interconnecting wellbore 16 can be cased or include a liner (not shown). The interconnecting wellbore 16 is connected to the surface wellbores 12, 14 at respective junctions 13, 15. Each junction 13, 15 is similar to a heel of a non-vertical wellbore, fluidly connecting the vertical surface wellbores 12, 14 to the interconnecting wellbore 16. In certain instances, the junctions 13, 15 can be left open hole.

The interconnecting wellbore 16 can include any directional profile or any type of non-vertical, deviated or lateral wellbore such as a horizontal wellbore, a slanted wellbore, or a curved wellbore. For example, in certain instances, the interconnecting wellbore 16 is horizontal, as shown in FIG.

1, slanted, with one of the junctions 13, 15 residing below the other one of the junctions 13, 15, or with an intermediate point of the interconnecting wellbore 16 residing below the two junctions 13 and 15. In certain instances, the interconnecting wellbore 16 can follow the dip of the subterranean zone Z. The interconnecting wellbore 16 can be drilled with directional drilling equipment such as whipstocks, directional bottom hole assemblies, and rotary steerable systems.

The system 100 also includes a first, heat transfer working fluid 28 that resides inside and circulates in the geothermal well 10. The system 100 also includes a second working fluid 26 that can be selectively introduced and circulated in the geothermal well 10. The second working fluid 26 can have a fluid density greater than a fluid density of the first heat transfer working fluid 28. In certain instances, the second fluid is also a heat transfer fluid specified for use in the system 100, like the first heat transfer fluid, for collecting heat energy from the subterranean zone Z. The second working fluid 26 can be periodically stored in a container, vessel, pit, or subsurface cavity at or near the surface 11, and circulated when needed or it can be continuously circulated in the well 10. FIG. 1 shows the second working fluid 26 having been introduced upstream of the first heat transfer working fluid 28, so as to impart its potential energy (e.g., from its hydrostatic head) to the first heat transfer working fluid 26. The pump 18 can circulate the fluids, including the second working fluid 26, from subterranean zone Z to the surface outlet wellbore 14 and between the surface equipment. Introducing the second working fluid 26 upstream of the first heat transfer working fluid 28 pushes the first heat transfer working fluid 28 toward the surface outlet 24 of the outlet wellbore 14. At the surface, the facility 22 collects energy from the mobilized first heat transfer working fluid received at the surface outlet 24.

The pump 18 can circulate the second working fluid 26 by flowing the fluid 26 from the surface inlet 21 to the interconnecting wellbore 16 and from the interconnecting wellbore 16 to the surface outlet wellbore 14. In some implementations, the pump 18 only lifts the second working fluid 26 from the interconnecting wellbore 16 to the surface, and the second working fluid 26 flows downhole from the inlet 21 to the interconnecting wellbore 16 without being moved by the pump 18 (e.g., falling only by gravity). The second working fluid 28 falls to a downhole location 17 (e.g., to the interconnecting wellbore 16), pushing the first heat transfer working fluid 28 from the interconnecting wellbore 16 to the surface outlet 24 of the geothermal well 10. In some cases, the pump 18 does not lift any fluid and the fluids 26, 28 can circulate in the well by a thermosiphon effect caused by the fluids being heated in the interconnecting wellbore 16.

The energy collection facility 22 can collect energy from the first heat transfer working fluid 28, and in some instances also the second working fluid 26, at the terranean surface 11. In certain instances, the energy collection facility 22 can store the energy collected from the fluid(s), or the fluids themselves. In certain instances, the energy collection facility 22 can also convert and use the thermal and/or kinetic energy of the fluid(s) to generate electricity, produce mechanical work, heat a facility or district, and/or for another purpose. For example, in certain instances, the energy collection facility 22 can include a steam turbine generator that uses steam generated from the collected heat, a Rankine Cycle, Organic Rankine Cycle and/or another heat cycle generator that operates from the collected heat, and/or another process. In certain instances, the facility 22 includes a heat exchanger 31 coupled to surface outlet 24 to receive the working fluid(s) for transferring the heat of the working fluid(s) to an associated process. In certain instances, the facility 22 includes an expander and/or impeller coupled to the surface outlet 24 to receive the working fluid(s) and collect kinetic energy of the moving working fluid(s). The expander and/or impeller is itself coupled to an electric generator or other process to use the kinetic energy. The facility 22 can also include other aspects, such as a filtration system, valves, pumps and other fluid handling equipment.

To facilitate pushing the first heat transfer working fluid 28, the second working fluid 26 can be immiscible with the first heat transfer working fluid 28. For example, although the working fluids can be many different types of fluids, in certain instances, the first heat transfer working fluid 28 can be water or otherwise aqueous and the second working fluid 26 can be an oil-based fluid (e.g., an oil-based fluid containing barite). In some implementations, the two fluids 26, 28 can be separated by an immiscible slug, pill or an interface 23 such as a physical spacer, plug or partition between the two fluids 26, 28. In some cases, the fluids can be miscible so that the two or more fluids in the well mix as the fluids circulated in the well.

The composition of the fluids 26, 28 can be selected so that the density of the second fluid 26 is higher than the first fluid 28. For example, if the first fluid 28 is water, the denser second fluid 26 can include water with dispersed or suspended solid particles such as barite, iron, clay, bentonite, or other dense particles (relative to the carrier fluid, water), so that the mixture density of the second fluid 26 is higher than the density of first fluid 28. Alternatively, a water solution containing dissolved salt such as calcium chloride or sodium chloride may be used to increase the density of the second fluid 26. Another alternative is to use an oil for the first fluid 28 (e.g., hexane or diesel or mineral oil or a synthetic thermal heat transfer oil) with a specific gravity less than 1.0, and use water for the second fluid. Many combinations of mixtures including solids, liquids, and gases may be selected; the methodology for selecting the fluids involves calculating or measuring the density of the bulk fluid, and selecting a fluid composition for the second fluid 26 that is greater than the density of the first fluid 28.

The second working fluid 26 can have different characteristics that increase the energy output or otherwise increase the efficiency of the system 100. For example, the second working fluid 26 can have a coefficient of thermal expansion that is equal to or greater than a coefficient of thermal expansion of the first heat transfer working fluid 28. For example, in certain instances, the first heat transfer working fluid 28 can be water or other aqueous fluid and the second working fluid 26 can have a thermal expansion coefficient that is one or more orders of magnitude (e.g., two orders of magnitude) greater than the thermal expansion coefficient of water. For example, in certain instances, if the first heat transfer working fluid 28 has a coefficient of thermal expansion of 0.0002568 L/° C., the second working fluid 26 can have a coefficient of thermal expansion of 0.02568 L/° C. Additionally, in the example, the second working fluid 26 can have a density of about 2.67 g/cc and a viscosity of about 12.18 cP. With such a configuration, the second working fluid 26 can be circulating in the well 10 so that the fluid 26 expands, by absorbing heat from the target subterranean zone "Z," in the interconnecting wellbore 16, increasing a volume of the second working fluid 26 and allowing the fluid 26 to expand primarily in one direction, toward the surface outlet 24. The expansion of the second working fluid 26 further pushes the first heat transfer working fluid 28 and increases the flow rate of the first heat transfer working fluid 28 at the surface outlet 24 of the geothermal well 10. The increase in flow rate of the first heat transfer working fluid 28 can increase an energy output of the energy collection facility 22.

Furthermore, the first heat transfer working fluid 28 and the second working fluid 26 can be incompressible or substantially incompressible, which can allow pressure to be transferred from the second working fluid 26 to the first heat transfer working fluid 28 without a substantial change in their density. In other words, the second working fluid 26 can transfer gravitational potential energy when falling down to the first heat transfer working fluid 28 without substantially compressing the fluids 26, 28. In some cases, one or both of the heat transfer working fluids 26, 28 can be configured to be supercritical in the interconnecting wellbore 16, which, in certain instances, have a higher thermodynamic heat transfer efficiency than fluids that are not supercritical in the wellbore 16. In certain instances, the supercritical fluid can be or include carbon dioxide ($CO_2$).

One or both of the working fluids can alternatively or additionally include engineered refrigerants, hydrocarbons, alcohols, organic fluids and combinations thereof, and may additionally have additives, such as anti-scaling agents, anti-corrosion agents, and friction reducers.

The density and volume of the second working fluid 26 can be changed at the surface 11. For example, the fluid handling facility 20 (or another piece of surface equipment) can add more fluid or additives to the second working fluid 28 to increase its volume or density or both. In some cases, the system 100 can flow multiple fluids or fluid pills of the same or different composition that are denser than the first heat transfer working fluid 28 to increase an energy output of the system 100. For example, the pump 18 or the fluid handling facility 20 can introduce a third working fluid 25 in the well 10. The working fluid 25 (which, in certain instances, is a heat transfer working fluid) is introduced upstream of the second working fluid 26 and can mix with or be immiscible with the second working fluid 26. The third working fluid 25 flows from the surface inlet 21 to the downhole location 17, pushing the second and first working fluids 26, 28 toward the surface outlet 24 of the geothermal well 10. In certain instances, fourth, fifth and yet additional working fluids can be introduced to the geothermal well 10.

Before and/or during circulation of the working fluids 26, 28, a sealant can be circulated in the well 10 to form a sealed interface between the open hole portions of the well 10 and the surrounding earth "E" of the subterranean zone "Z." The interface can form in the junctions 13, 15 and the interconnecting wellbore 16.

The interface can be a thermally conductive interface, e.g., by using sealant with additives to improve the thermal conductivity, and can be impermeable to fluids. The thermal conductivity of the interface can allow thermally charging, through the thermally conductive interface, the second working fluid 26 to facilitate the thermal expansion of the second working fluid 26. The interface can seal against (e.g., limit or wholly prevent) fluid exchange between the well 10 and the surrounding earth "E" of the subterranean zone "Z." The sealant can include a proppant, sealant particles such as bentonite (or other sealant), wettability agents and/or other additives. A wetting agent can be used to enable phase blocking of the working fluid and to keep the fluid from leaking out of the conduits. A proppant can be used to maintain conduits or fractures extending from the interconnecting wellbore 16 open with a determined permeability. In some implementations, the interface has a permeability lower than the surrounding earth "E." For example, the interface 130 can have a permeability of 10 mD or less.

The geothermal system 100 can be part of a power production system 101 that includes an electrical grid 38 and one or more types of intermittent renewable energy sources 37 such as solar panels 36 and wind turbines 35. For example, the geothermal system 100 includes a controller 19 connected (e.g., operatively and communicatively connected) to the energy collection facility 22, to the intermittent energy sources 37, and to the electrical grid 38. The energy collection facility 22, the intermittent energy sources 37, and the electrical grid 38 can be electrically interconnected to transmit electricity between such components. For example, the controller 19 can change the geothermal system between a charging and discharging cycle to supply electricity to the grid 38 based on an energy demand of the grid 38.

In some implementations, the controller 19 can be implemented as one or more processors, computers, microcontrollers, or a combination thereof. The controller 19 can be part of a single or separate electrical control panels. In some implementations, the controller 19 can be implemented as a distributed computer system disposed partly at the energy collection facility 22 (or some other equipment of the system) and partly at an electrical control panel separated from the system. The computer system can include one or more processors and a computer-readable medium storing instructions executable by the one or more processors to perform the operations described here. In some implementations, the controller 19 can be implemented as processing circuitry, firmware, software, or combinations of them.

Figure 2:
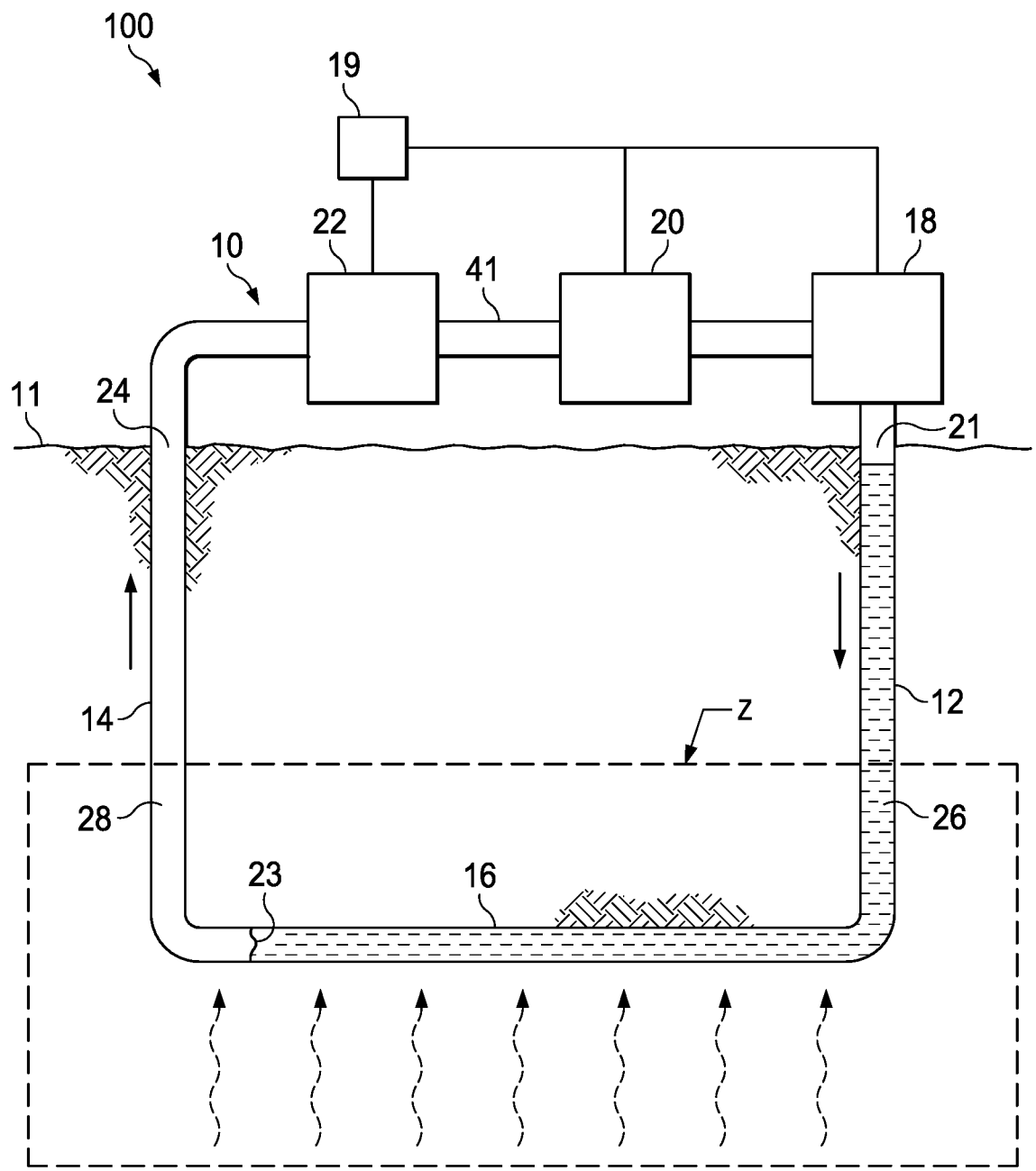
FIG. 2 is a side schematic view of the geothermal system in FIG. 1, during an energy discharging cycle.
Figure 3:
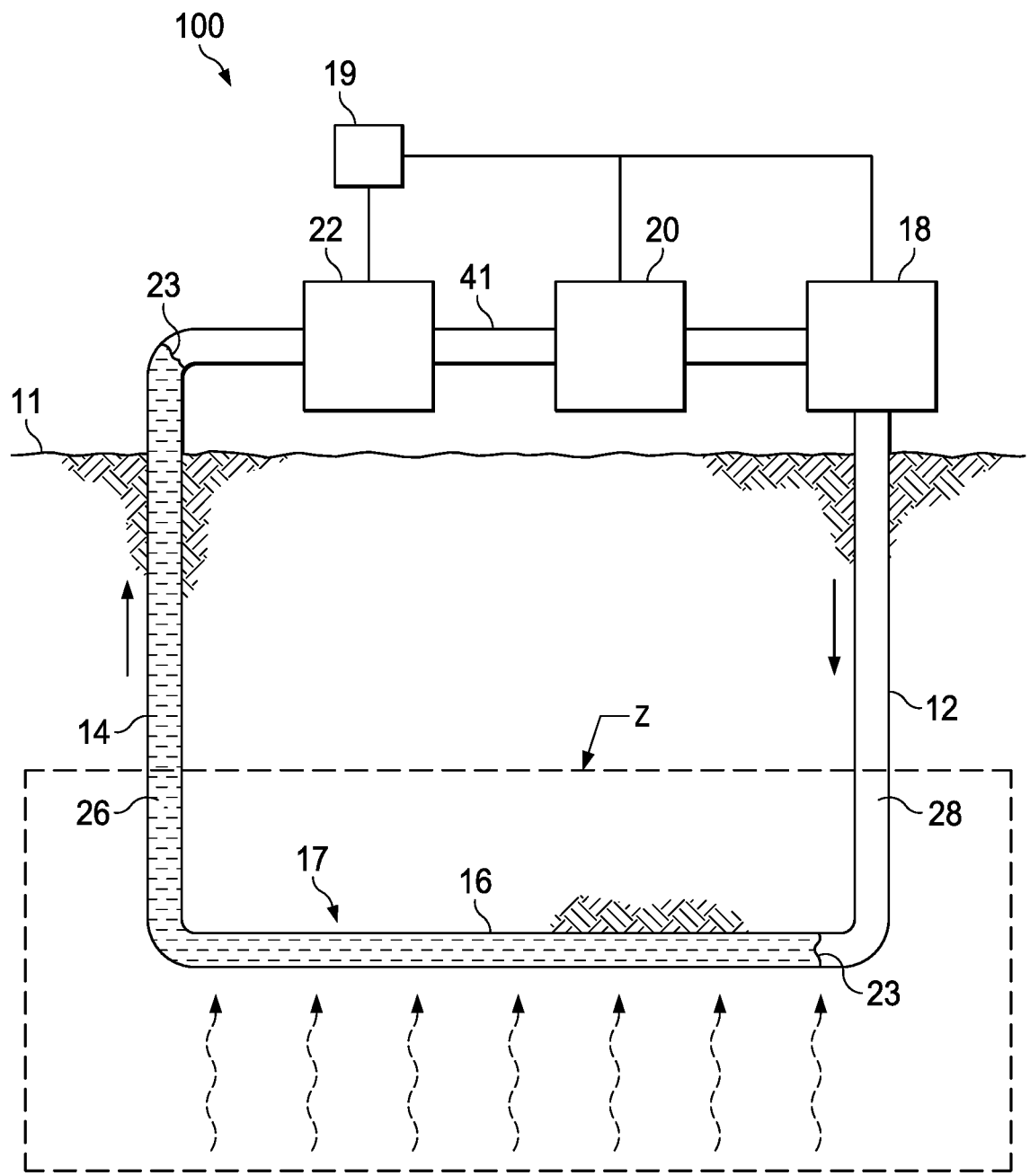
FIG. 3 is a side schematic view of the geothermal system in FIG. 1, during an energy charging cycle.

Referring to FIGS. 2 and 3, the controller 19 can change the flow rate of the heat transfer working fluids 26, 28 between a discharging cycle (as shown in FIG. 2) and a charging cycle (as shown in FIG. 3). For example, the controller 19 can change the flow rate of the pump 18 or open and close valves of the well 10 to circulate the fluids in the well 10. As shown in FIG. 2, during the discharging cycle, the second working fluid 26 circulates in the geothermal well 10, pushing the first heat transfer working fluid 28 toward the surface outlet 24 of the well 10 to collect energy from the first heat transfer working fluid 28. As shown in FIG. 3, during the charging cycle, the second working fluid 26 (and in some cases part of the first heat transfer working fluid 28) is lifted from the downhole location 17 of the well 10 to the surface 11.

As shown in FIG. 2, during the discharging cycle, the second working fluid 26 is routed to the surface inlet wellbore 12 by the pump (or by opening a valve) at the surface piping 41 or at the inlet wellbore 12 to let the fluid sink or fall in the well. For example, the second working fluid 26 can be stored at near or above the surface inlet wellbore 12, or the surface piping 41 can be slanted to facilitate the flow of the second working fluid 26 from the surface outlet 24 to the surface inlet 21. In some implementations, the second working fluid 26 is stored at the surface without the need of a valve.

During the discharging cycle, heat from the subterranean zone "Z" increases the temperature of the first and second working fluids 26, 28, which, in certain instances, generates a thermosiphon that drives or mobilizes the fluids 26, 28 from the interconnecting wellbore 16 to the surface outlet 24 of the well 10. The thermosiphon can increase the kinetic energy and thus the energy output of the first heat transfer working fluid 28 and can additionally lift the second working fluid 26 along the surface outlet well 14, allowing the system to convert thermal energy in the charging cycle to gravitational potential energy (e.g., via the thermosiphon to elevate the heavier fluid). The thermosiphon effect can be supplemented by the weight of the second working fluid 26 falling through the well 10. For example, in some instances, the potential energy imparted by the second working fluid 26 to the first heat transfer working fluid 28 causes the first heat transfer working fluid 28 to flow faster than it would by thermosiphon without the second working fluid 26.

The second working fluid 26 can also absorb heat from the subterranean zone "Z" to increase in temperature and expand. The collection facility 22 collects energy from the first fluid (and in some cases from the second fluid and other fluids) to generate at least one of hydraulic energy, thermal energy, or mechanical energy from the mobilized first heat transfer working fluid. For example, the heat absorbed by the first fluid (or the second fluid) and the kinetic energy of the moving fluid can be used to generate electricity (e.g., in a turbine) or work (e.g., in a heat engine).

As shown in FIG. 3, during the charging cycle, the second working fluid 26 is flowed, by the pump 18 or by the thermosiphon effect created by the heat of the subterranean zone "Z," uphole from the interconnecting wellbore 16 to the surface piping 41. As the second working fluid 26 is flowed uphole, the first heat transfer working fluid 28 can be flowed to the downhole location 17 of the well 10. For example, the first heat transfer working fluid 28 can be flowed to the interconnecting wellbore 16 such that the first heat transfer working fluid 28 extends from the inlet wellbore 12 to the outlet wellbore 14. All or part of the second working fluid 26 can be stored at or near the surface to be flowed downhole during the discharging cycle.

Referring also to FIG. 1, in certain instances, the controller 19 can determine, based on a power output of the intermittent electricity sources 37 (or an energy demand of the grid 38), a power requirement of the grid 38. For example, the controller 19 can determine (e.g., predict based on a schedule or based on real-time information received from the intermittent energy sources, weather information, or other related information) when the power output of the intermittent energy sources 37 does not meet or will not meet a power requirement of the grid 38. Such periods of time can be, for example, during the night when the solar panels 36 do not generate electricity or during periods of low wind when the wind turbines 35 do not generate electricity. Based on the determination that the intermittent energy sources 37 do not or will soon not meet the demand of the grid 38, the controller 19 can initiate the discharging cycle by flowing the second working fluid 26 downhole and thus begin generating electricity from the first heat transfer working fluid 28 at the collection facility 22. In certain instances, the controller can 19 receive signals from outside system 101 indicating that the intermittent energy sources 37 do not or will soon not meet demand, and initiate the discharging cycle.

As used herein, the term "real-time" refers to transmitting or processing data without intentional delay given the processing limitations of a system, the time required to accurately obtain data, and the rate of change of the data. Although there may be some actual delays, the delays are generally imperceptible to a user.

Once the power requirement of the grid 38 changes (e.g., by a diminished demand of the grid or an increased energy output of the intermittent energy sources 37), the controller 19 can switch the geothermal system 100 to the charging cycle or mode by lifting the second working fluid 26 from the downhole location 17 to the surface 11. The controller 19 can initiate the charging cycle when the intermittent energy source 37 meets or exceeds the energy demand of the grid 38. For example, the pump 18 can be electrically connected to and powered by the intermittent energy sources 37. The pump 18 uses the electricity of the intermittent energy source 37 and/or the grid 38 to lift the second fluid 28. The second working fluid 26 can thus store the energy from the intermittent energy sources 37 in the form of potential energy. Thus, the controller 19 can switch the closed loop geothermal system 100 between charging cycles and discharging cycles to provide, together with the intermittent power production source 37, a dispatchable energy output to the electrical grid 38. In some implementations, the geothermal system 100 can be used in combination with other energy production sources such as nuclear power plants, natural gas power plants, coal power plants, or hydroelectric power plants.

The controller 19 can be operatively coupled to and configured to control the pump 18 and the fluid handling facility 20. For example, initiating the charging cycle can include activating, by the controller 19, the pump 18 to begin lifting the second working fluid 26. The controller 19 can also increase or decrease the speed of the pump 18 to increase or decrease the flow rate of one or both of the heat transfer working fluids 26, 28. The controller 19 can stop the pump 18 during the discharging cycle. For example, during the discharging cycle, the controller 19 stops the pump 18 and directs electricity generated at the collection facility 22 to the electrical grid 38 to supplement the energy output of the intermittent energy source 37.

Additionally, the controller 19 can change, by controlling the pump 18 or the fluid handling facility 20, at least one of: a temperature, a residency time within the subterranean zone "Z," and/or a fluid density of at least one of the first heat transfer working fluid 28 or the second working fluid 26 to change a specified energy output of the first heat transfer working fluid 28. For instance, the fluid handling facility 20 can increase the fluid density of the second working fluid 26 by adding an additive to the fluid, or the fluid handling facility 20 can heat or cool the second working fluid 28 to increase or decrease its viscosity. Residency time refers to a period of time it takes a fluid molecule to flow from the surface inlet 21 to the surface outlet 24. Residency time can be calculated as volume divided by flow rate. The controller 19 can change the residency time of the second fluid 26 by changing the flow rate of the second working fluid 26 in the well 10. Changing residency time (or flow rate) enables control of the discharging and charging cycle times and shapes the energy output of the system. For example, changing residency time enables the system (or multiple geothermal systems aggregated together) to deliver on-demand energy to an end-user, or shape the output to meet an end-user's demand profile, or to integrate with intermittent renewable sources such as wind or solar.

In some implementations, if excess electricity is created by the collection facility 22, the excess electricity can be stored in a suitable storage device such as a battery or super capacitors, or used to lift another fluid in a similar geothermal well. Additionally, although discussed in terms of supplying power to a grid and controlling the geothermal well 10 based on output from intermittent energy sources 37 producing electricity, these same concepts could be applied in systems of other energy domains and/or mixed energy domains. For example, in certain instances, the controller 19 can change between a charging cycle and discharging cycle based on heat requirements of a heat supply system to an industrial process, municipal district or other system using the heat directly.

Figure 4:
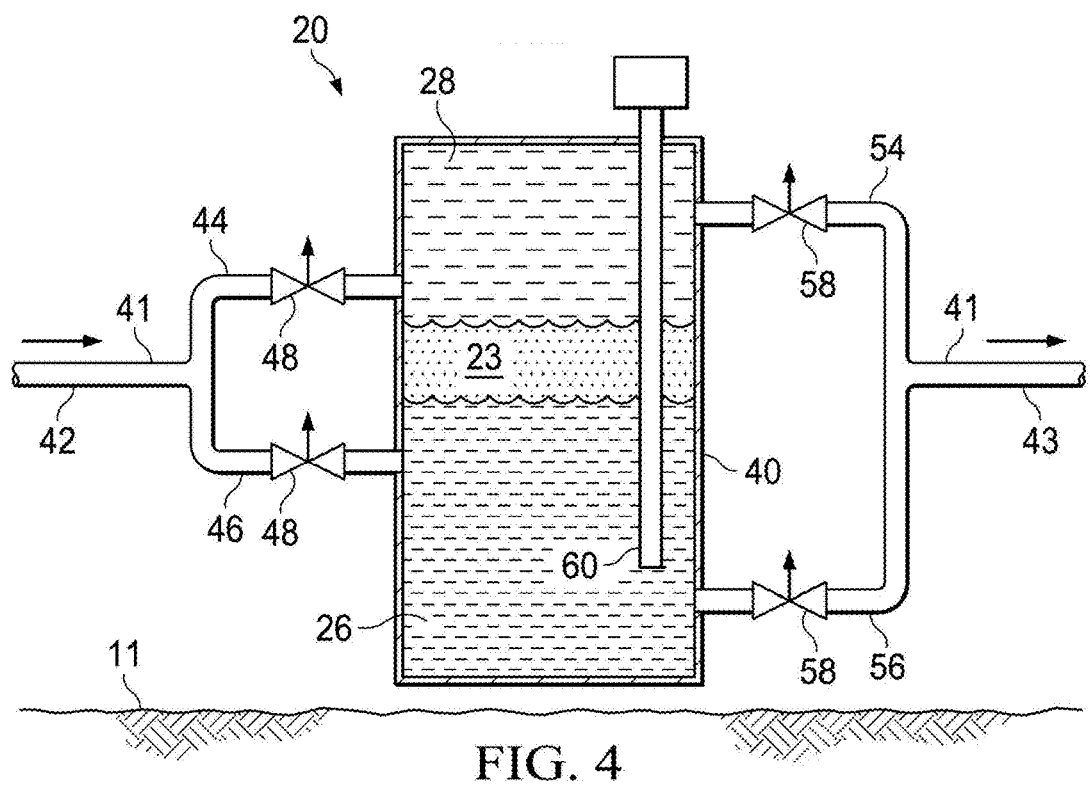
FIG. 4 is a schematic view of a surface fluid handling facility of the geothermal system in FIG. 1.

FIG. 4 shows a schematic view of an example fluid handling facility 20. The fluid handling facility 20 can control or change the sequence, timing, flow rate, volume, and routing of the fluids 26, 28 (and other working fluids) in the well 10. The example fluid handling facility 20 includes a container, tank or separator vessel 40 (for separating the fluids 26, 28 after having been flowed together through the well 10), a fluid level meter 60, two or more fluid inlet pipes 44 and 46, two or more fluid outlets pipes 54 and 56, and respective valves 48 and 58 in each of the respective inlet pipes and outlet pipes. The inlet pipes 44 and 46 are fluidly coupled (e.g., by a Y-pipe fitting or a manifold), to a supply pipe 42 of the surface piping 41, and the outlet pipes 54 and 56 are fluidly coupled (e.g., by a Y-pipe fitting or a manifold), to a return pipe 43 of the surface piping 41. The fluid level meter 60 can detect the level of each fluid 26, 28 (and of the interface 23 if applicable), and the fluids 26, 28 can be flowed in and out of the tank 40 by opening and closing the valves to initiate cycles of the system, separate the fluids, inject other dense fluids, or for other related purposes.

Figure 5:
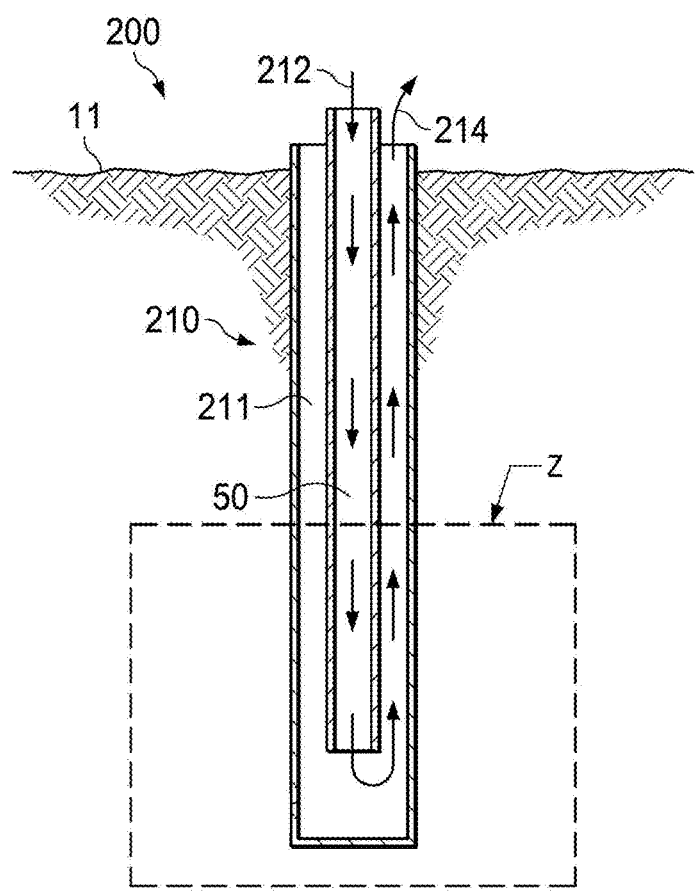
FIG. 5 is a side schematic view of a geothermal system according to a second implementation of the present disclosure.

Notably, the geothermal well can take many other configurations beyond that shown in FIG. 1. FIG. 5 shows another example geothermal system 200 that includes a geothermal well 210 with a wellbore string 50 disposed inside the well 210. The geothermal well 210 can be vertical (as shown) or non-vertical (e.g., deviated, slanted, horizontal and/or otherwise non-vertical). The wellbore string 50 forms, with a wall of the well 210, an annulus 211. The surface inlet 212 of the well 210 can be the top fluid inlet of the wellbore string 50 and the surface outlet 214 of the well 210 can be a top fluid outlet of the annulus 211. The well 210 can be connected to a pump, a collection facility, and a fluid handling facility as shown in FIG. 1, and the well 210 can be part of a power production system 101 as shown in FIG. 1.

Figure 6:
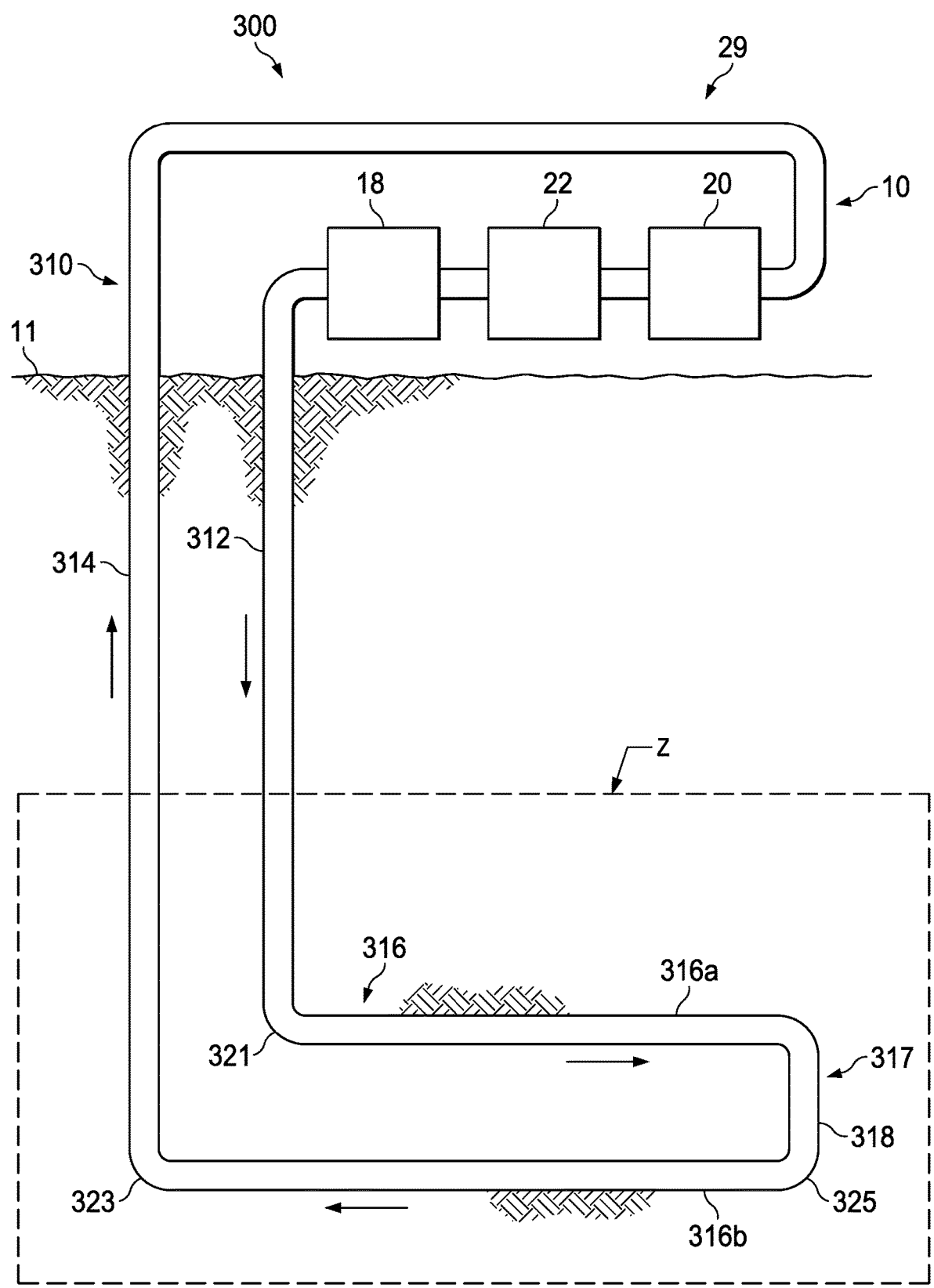
FIG. 6 is a side schematic view of a geothermal system according to a third implementation of the present disclosure.

FIG. 6 illustrates another example geothermal system 300 that includes a geothermal well 310 with an inlet wellbore 312, an outlet wellbore 314, and an interconnecting wellbore 316 deviated from the inlet wellbore 312 and the outlet wellbore 314 in a non-vertical direction. For example, the inlet wellbore 312 and the outlet wellbore 314 can be "co-located" or located relatively near to each other (e.g., on the same pad), with the interconnecting wellbore 316 forming, in side view, a C shape, instead of extending directly from the inlet wellbore 312 to the outlet wellbore 314. The interconnecting wellbore 316 can be cased or open hole.

The interconnecting wellbore 316 includes two 'stacked' laterals 316a and 316b. For example, the interconnecting wellbore 316 includes a first lateral wellbore 316a fluidly coupled to and extending from a downhole end of the surface inlet wellbore 312 to a toe 317 of the first lateral wellbore 316a. The interconnecting wellbore 316 also includes a second lateral wellbore 316b fluidly coupled to and extending from a downhole end of the surface outlet wellbore 314 to the toe 317 of the first lateral. In some implementations, a wellbore 318 can connect the two ends of the lateral wellbores 316a and 316b. The second lateral wellbore 316b resides below or next to the first lateral wellbore 316a. For example, the first lateral wellbore 316a can reside directly above or vertically offset with respect to the second lateral wellbore 316b.

To form the geothermal well 310, the surface inlet wellbore 312 can be formed as a directional wellbore (e.g., including a vertical and a non-vertical section) and the surface outlet wellbore 314 can be formed as a similar directional wellbore extending in the same direction. The surface directional inlet wellbore includes a first heel 321 and a first toe 317 disposed in the subterranean zone "Z" and the surface directional outlet wellbore includes a second heel 323 and a second toe 325. The second toe 325 is fluidly coupled, at a common downhole joint 318 of the well 310, to the first toe 317 such that, in side view, the two directional wellbores form an "L shaped" wellbore. The laterals 316a, 316b can be horizontal or slanted. The surface equipment 29, which includes one or more of the collection facility 22, the pump 18, or the fluid handling facility 20, circulate the heat transfer working fluids in a similar manner as described above with respect to FIGS. 1-5. The well 310 can be part of a power production system 101 as shown in FIG. 1.

In some implementations, the heels 321, 323 can be open hole. Additionally, the laterals 316a and 316b as well as the toes 317 and 325 can be open hole. The open hole sections of the well 310 can have a substantially impermeable interface between the wellbore and the surrounding earth or rock of the subterranean zone "Z."

Figure 7:
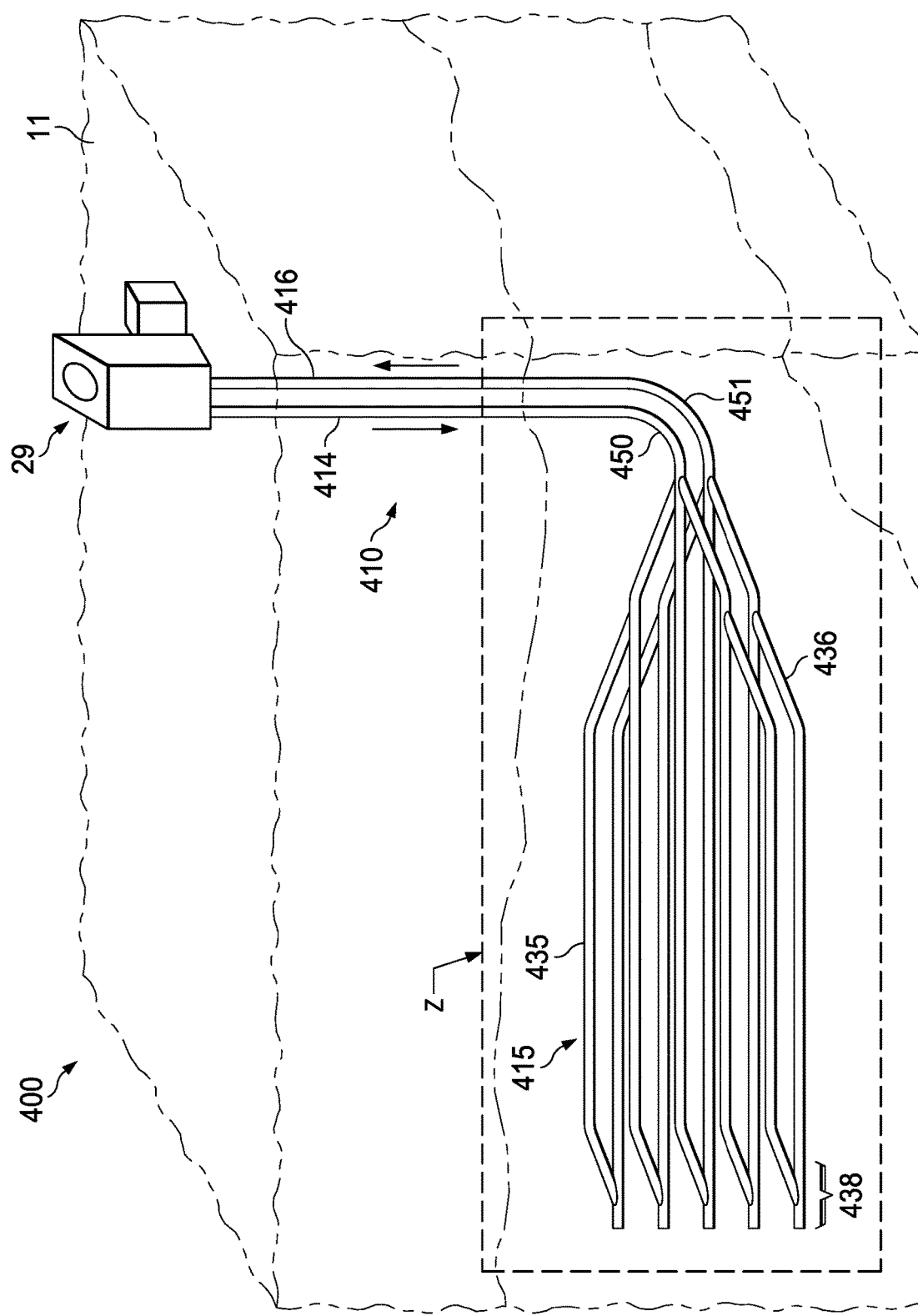
FIG. 7 is a perspective schematic view of a geothermal system according to a fourth implementation of the present disclosure.
Figure 8:
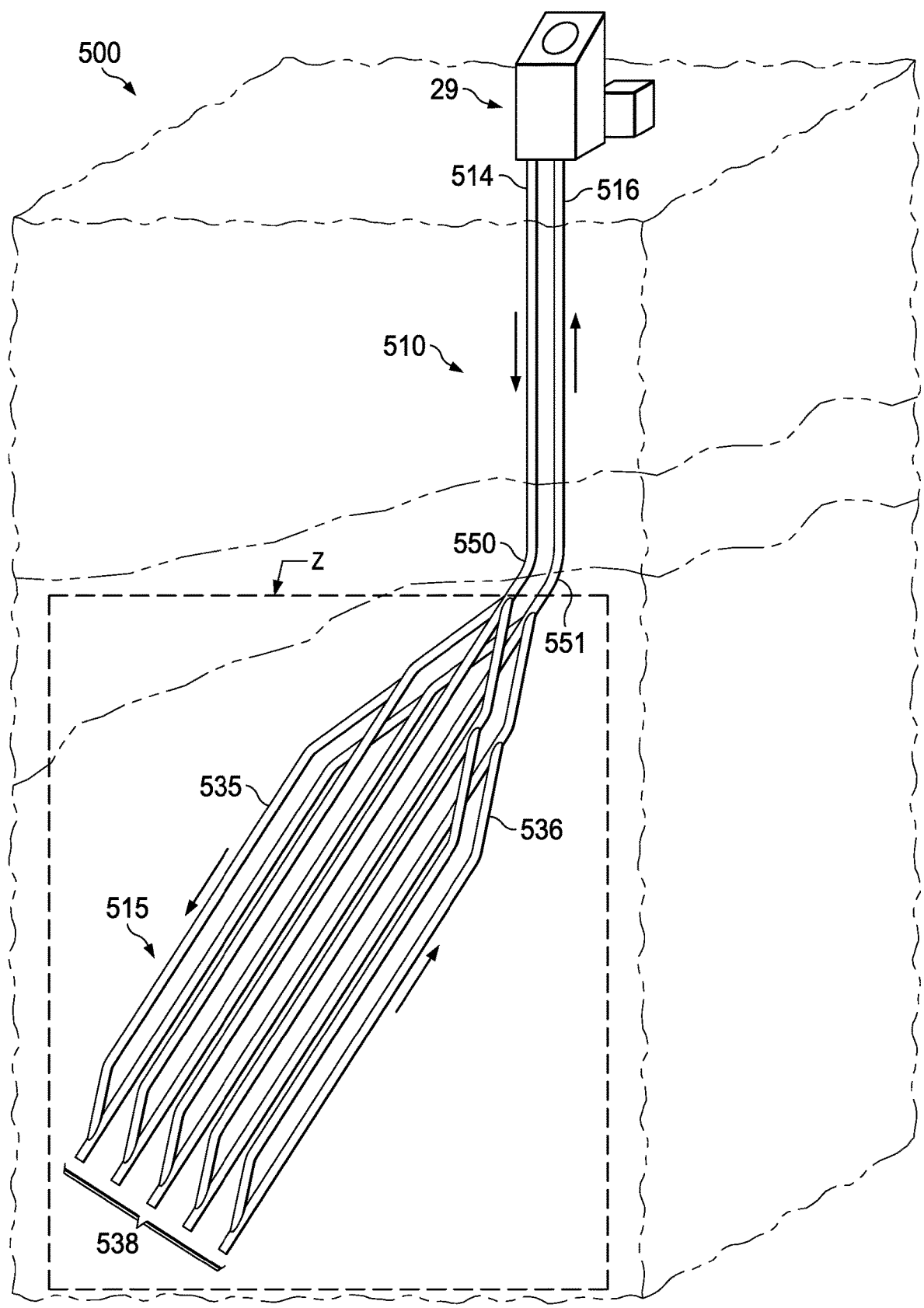
FIG. 8 is a perspective schematic view of a geothermal system according to a fifth implementation of the present disclosure.

FIGS. 7 and 8 show other example geothermal wells 410 and 510. The wells 410 and 510 can be part of a power production system 101 as shown in FIG. 1. FIGS. 7 and 8 show geothermal systems 400, 500 respectively that include a geothermal well 410, 510 respectively and surface equipment 29 that includes at least one of the collection facility 22, the pump 18, or the fluid handling facility 20 shown in FIG. 1.

FIG. 7 shows a geothermal well 410 that has multiple deviated wellbores 415 fluidly coupled to and extending from a common downhole end 450 of the surface inlet wellbore 414 to a common downhole end 451 of the surface outlet wellbore 416. Each deviated wellbore 415 resides in the target subterranean zone "Z." Each deviated wellbore 415 includes a first lateral wellbore 435 extending from the downhole end 450 of the surface inlet wellbore 414 to a downhole junction 438. Each deviated wellbore 415 also includes a second lateral wellbore 436 extending from the downhole end 451 of the surface outlet wellbore 416 to the downhole junction 438. The two lateral wellbores 435, 436 are fluidly interconnected (e.g., intersect) at the downhole junction 438. The first lateral wellbores 435 reside vertically above the second lateral wellbores 436.

FIG. 8 shows a geothermal well 510 substantially similar to the well 410 in FIG. 8, with the main difference that the group of deviated wellbores 515 are slanted instead of horizontal. Each deviated wellbore 515 includes a first lateral wellbore 535 extending from the downhole end 550 of the inlet wellbore 514 and a second lateral wellbore 536 extending from the downhole end 551 of the outlet wellbore 516. The laterals 535, 536 are connected at a common downhole junction 538. The lateral wellbores 535, 536 are slanted such that the downhole junction 538 resides at a depth greater than a depth of the downhole ends 550, 551 of the surface wellbores 514, 516.

Figure 9:
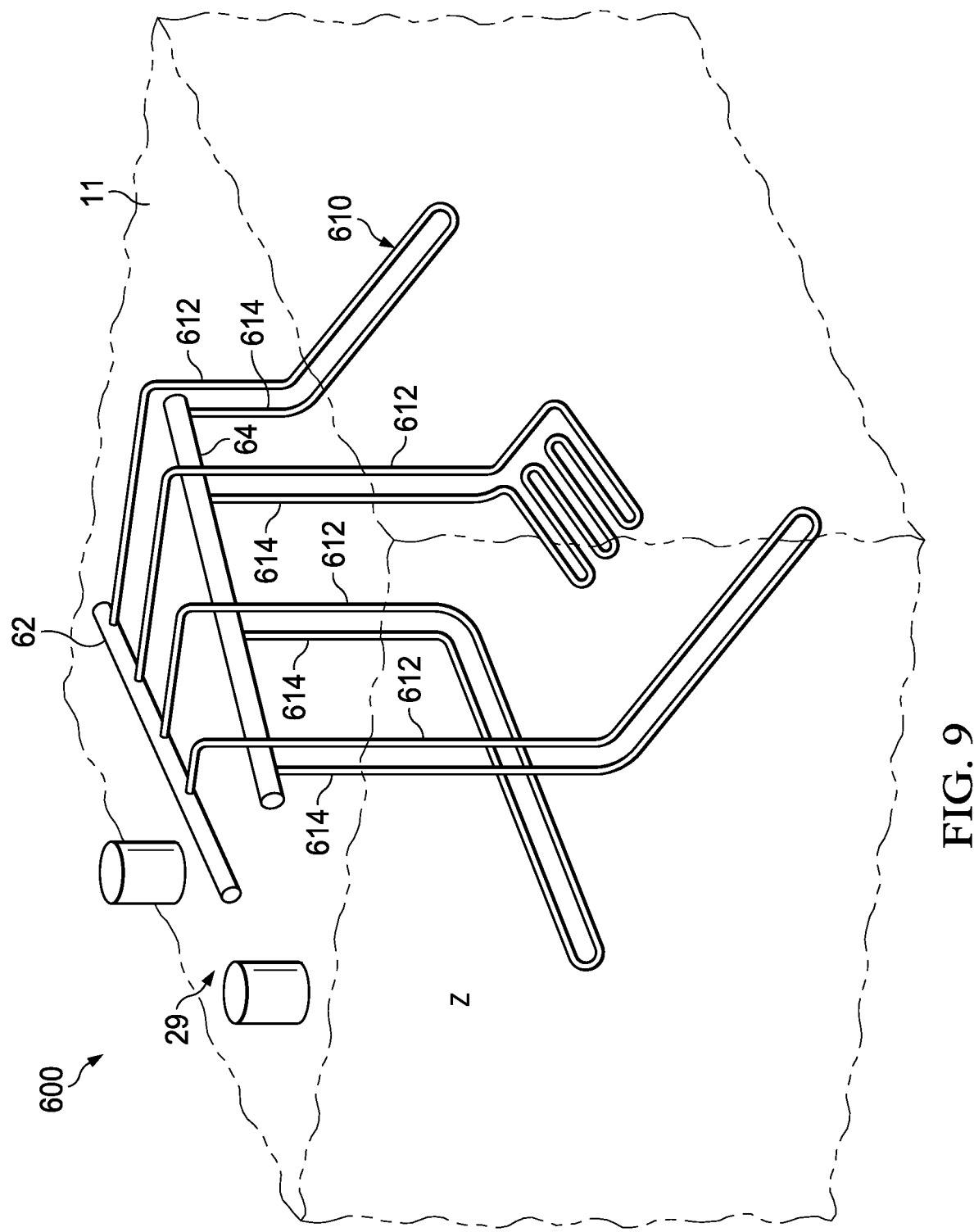
FIG. 9 is a perspective schematic view of a geothermal system according to a sixth implementation of the present disclosure.

FIG. 9 shows a geothermal system 600 that includes multiple wells 610 of different geometries or configurations to accommodate gradient variability within the subterranean zone "Z." For example, the wells 610 can be similar to any of the wells shown in FIGS. 1-8. The surface inlet wellbores or conduits 612 can be commonly connected to a first surface manifold 62. The surface outlet wellbores or conduits 614 can be commonly connected to a second surface manifold 64. The surface equipment 29 can be fluidly coupled to any of the manifolds 62, 64. The geothermal system 600 can collect different amounts of energy where variability exists within the well 610. The geothermal system 600 can also have a controller as shown in FIG. 1 to provide a predetermined energy output. For example, the energy output of each well 610 or a group of well 610 can be combined to provide electricity to another well 610 or to a grid.

Each well 610 can be closed loop geothermal wells and each can be operated similar to the wells described with respect to FIGS. 1-8. The energy collected from these wells 610 can be a selectively variable energy, and the energy can be amalgamated to generate an energy output of a predetermined quantity.

Figure 10:
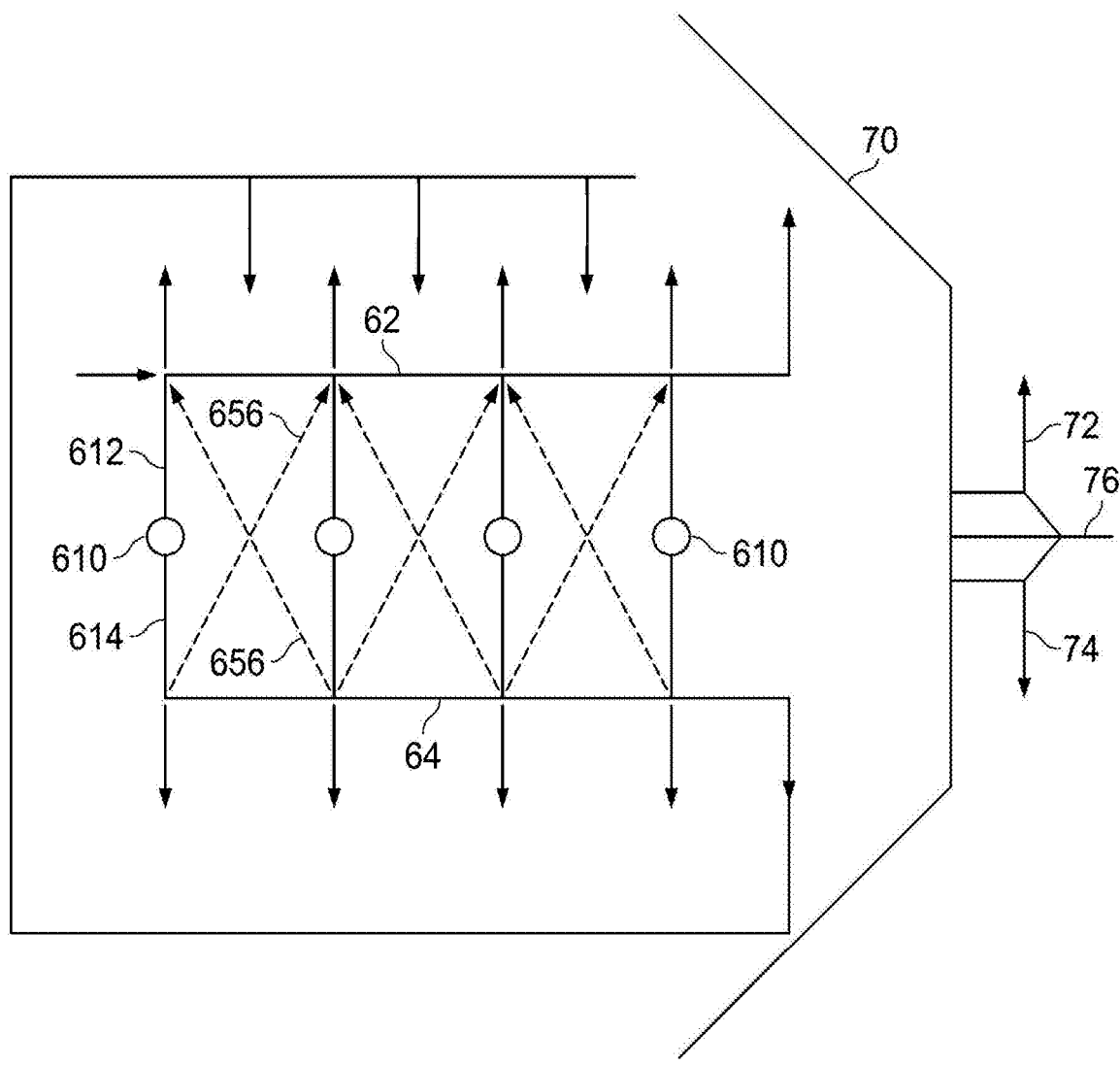
FIG. 10 is a schematic diagram of an energy transfer topography according to a first implementation of the present disclosure.

FIG. 10 is a schematic view of possible routing configurations of the geothermal system 600 in FIG. 9. For example, each well 610 can be independent with a respective inlet wellbore 612 and outlet wellbore 614. Electric lines 656 can be interconnected between outlet wellbores 614 and inlet wellbore 616 (e.g., between respective collection facilities and pumps) so that an outlet wellbore 614 can provide electricity to an inlet wellbore 314 (or to another outlet wellbore 314) commonly connected at the surface. Furthermore, the manifolds 64, 62 can be fluidly coupled to flow fluid between each manifold. The wells 610 can be connected to surface equipment associated with each individual well or to common equipment associated with multiple wells 610. The geothermal system 600 can be "tuneable" from one modular operation, i.e. a wellbore, intermittent source, electrical grid, to another to facilitate normalization of energy output. A collective output or energy 70 can be converted to electrical energy and routed to any part of a power production system. The energy can be provided as baseload 72 or dispatched electrical energy 74 switchable by a controller or power distributor 76 depending on specific parameters at any given point during a specific time frame.

Figure 11:
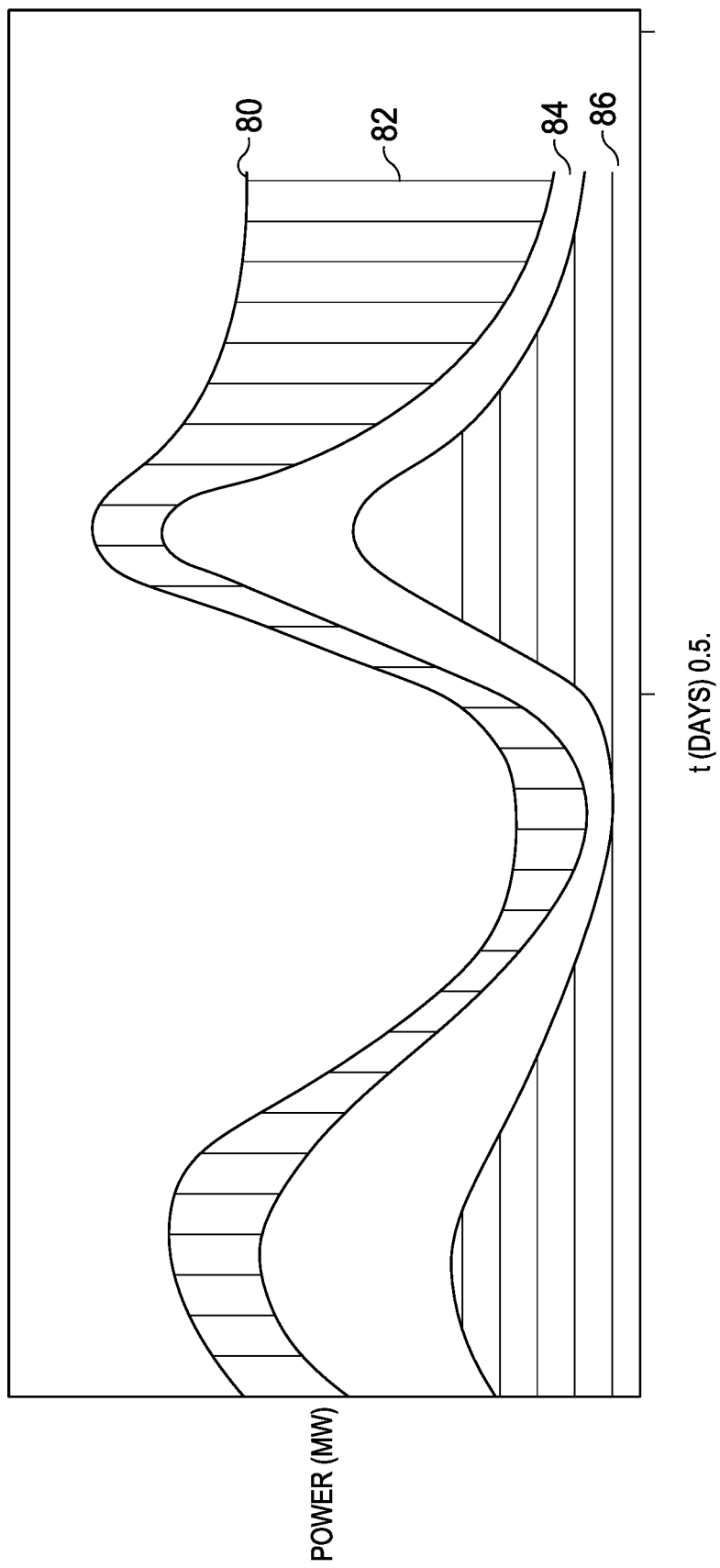
FIG. 11 is a graphical illustration of power as function of time curves of three geothermal systems.

FIG. 11 depicts graphical data illustrating power output of different geothermal well loops aggregated together. Operating parameters such as flow rate, sequencing of fluids, fluid compositions, and timing of charging/discharging cycles can be controlled for each loop to provide a planned shaped power output of the aggregated system. Numeral 80 represents demand, numeral 82 represents output from a first loop, numeral 84 represents output from a second loop, and numeral 86 represents output from a third loop. The parameters described above are controlled so that the aggregated output of the three loops is shaped to meet the end-user's demand profile.

Figure 12:
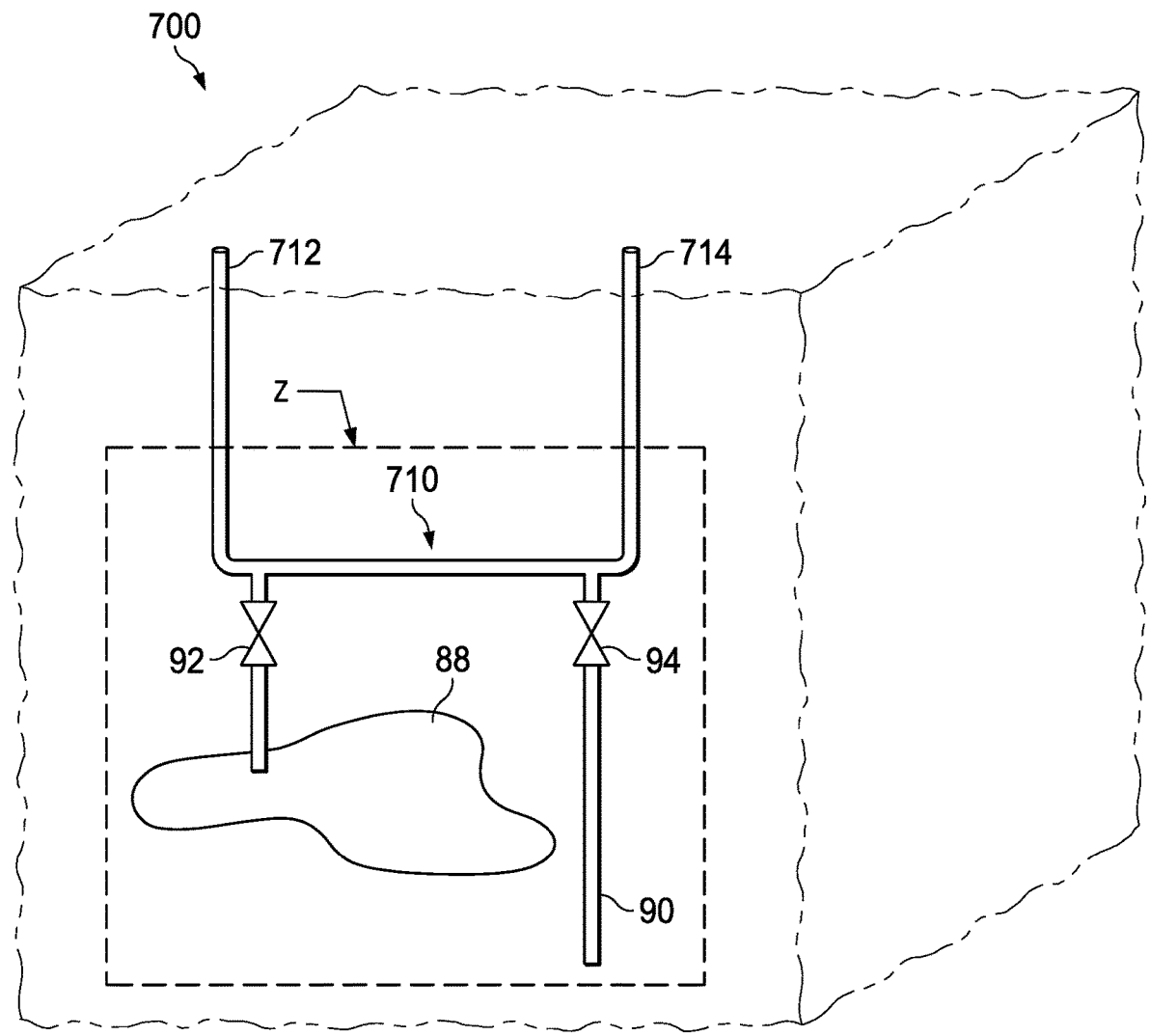
FIG. 12 is a perspective schematic view of a geothermal system according to a seventh implementation of the present disclosure.

FIG. 12 shows a geothermal system 700 that includes a geothermal well 710 fluidly coupled to a thermal repository 88 (e.g., a void or an underground reservoir) that resides the subterranean zone. The repository 88 may contain existing formation fluid or may be filled with a working fluid from the well 710. A valve 92 can be operated from the surface to close or open the fluid pathway between the well 710 and the thermal repository 88. Similarly, a downhole wellbore portion 90 can store fluid and be separated by a valve 94 in a similar way. The geothermal system 700 can facilitate induction of a thermosiphon when required and may be integrated in any of the embodiments discussed herein.

Figure 13:
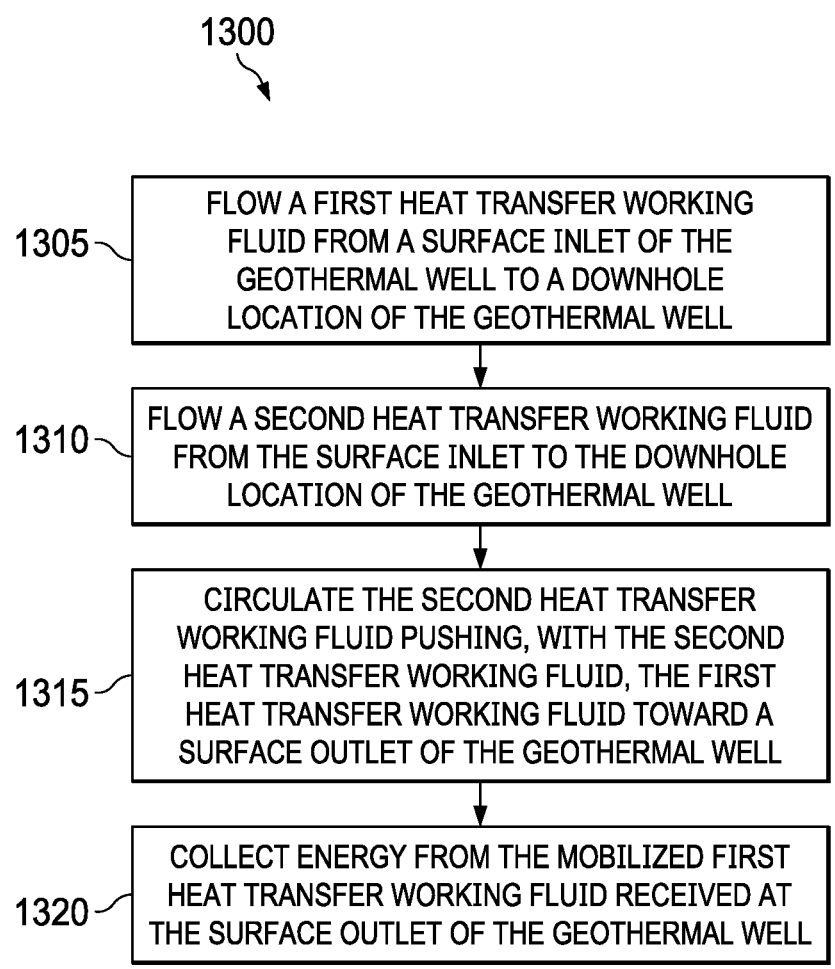
FIG. 13 is a flow chart of an example method of generating geothermal energy.
Figure 14:
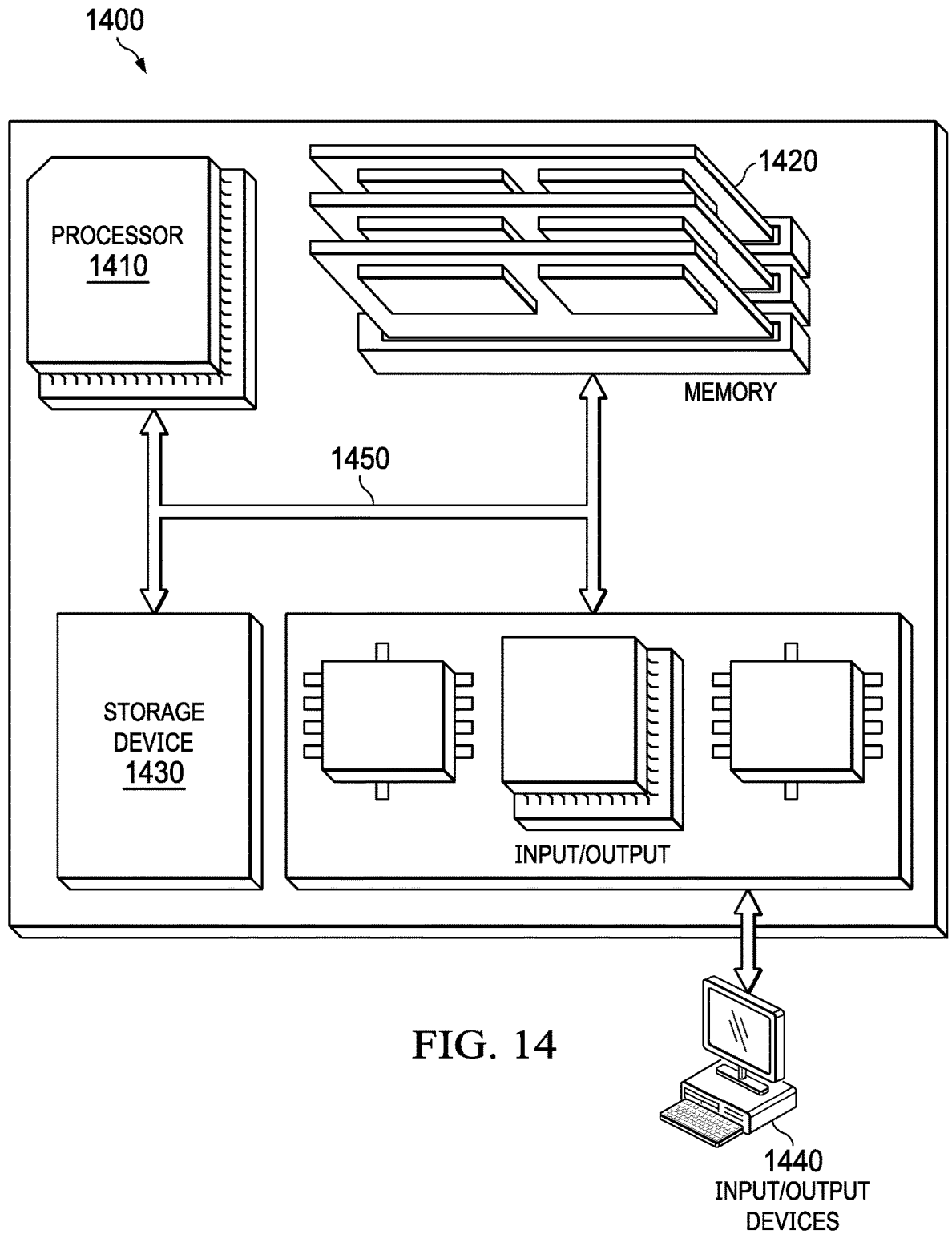
FIG. 14 is a diagram of an exemplary controller according to implementations of the present disclosure.

FIG. 13 is a flow chart of an example method 1300 of generating geothermal energy. The method includes flowing, in a closed loop geothermal well residing in a target subterranean zone, a first heat transfer working fluid from a surface inlet of the geothermal well to a downhole location of the geothermal well (1305). The method also includes flowing, in the geothermal well, a second working fluid from the surface inlet to the downhole location of the geothermal well. The second working fluid resides upstream of the first heat transfer working fluid. The second working fluid has a fluid density greater than a fluid density of the first heat transfer working fluid (1310). The method also includes circulating, in the geothermal well, the second working fluid pushing, with the second working fluid, the first heat transfer working fluid toward a surface outlet of the geothermal well (1315). The method also includes collecting energy from the mobilized first heat transfer working fluid received at the surface outlet of the geothermal well (1320).

FIG. 15 is a schematic illustration of an example controller according to the present disclosure. For example, the controller 1400 may include or be part of the controller 19 shown in FIG. 1. The controller 1400 is intended to include various forms of digital computers, such as printed circuit boards (PCB), processors, digital circuitry, or otherwise. Additionally, the system can include portable storage media, such as, flash drives. For example, the flash drives may store operating systems and other applications. The flash drives can include input/output components, such as a wireless transmitter or connector that may be inserted into a port of another computing device.

The controller 1400 includes a processor 1410, a memory 1420, a storage device 1430, and an input/output device 1440. Each of the components 1410, 1420, 1430, and 1440 are interconnected using a system bus 1450. The processor 1410 may include or be part of the processing device 120 shown in FIGS. 1-4, and is capable of processing instructions for execution within the controller 1400. The processor may be designed using any of a number of architectures. For example, the processor 1410 may be a CISC (Complex Instruction Set Computers) processor, a RISC (Reduced Instruction Set Computer) processor, or a MISC (Minimal Instruction Set Computer) processor.

In one implementation, the processor 1410 is a single-threaded processor or microprocessor or parametric controller. In another implementation, the processor 1410 is a multi-threaded processor. The processor 1410 is capable of processing instructions stored in the memory 1420 or on the storage device 1430 to display graphical information for a user interface on the input/output device 1440.

The memory 1420 stores information within the controller 1400. In one implementation, the memory 1420 is a computer-readable medium. In one implementation, the memory 1420 is a volatile memory unit. In another implementation, the memory 1420 is a non-volatile memory unit.

The storage device 1430 is capable of providing mass storage for the controller 1400. In one implementation, the storage device 1430 is a computer-readable medium. In various different implementations, the storage device 1430 may be a floppy disk device, a hard disk device, an optical disk device, or a tape device.

The input/output device 1440 provides input/output operations for the controller 1400. In one implementation, the input/output device 1440 includes a keyboard and/or pointing device. In another implementation, the input/output device 1440 includes a display unit for displaying graphical user interfaces (e.g., a hand held device).

Reference will now be made to multiple test or case studies performed in different geothermal wellbores. The test or case studies were calculated using a transient thermodynamic model of the system. Example 1 is a test performed in a U shaped wellbore similar to the wellbore in FIG. 1, with multiple interconnecting wellbores. Example 2 is a test performed in an L shaped wellbore similar to the wellbore in FIG. 7, converting excess pressure to electricity with a flow turbine. Example 3 is a test performed in an L shaped wellbore similar to the wellbore in FIG. 7, using an Organic Rankine Cycle (ORC) and converting excess pressure to higher flow rate. Example 4 is a test performed in an L shaped wellbore similar to the wellbore in FIG. 7, using an ORC with the second working fluid having a high coefficient of thermal expansion. Example 5 is a test performed in an L shaped wellbore similar to the wellbore in FIG. 8, using an ORC.

Example 1

Parameters:
  Well geometry: U shaped wellbore with 2 interconnecting lateral wellbores
  Total vertical depth (TVD): 2400 m
  Distance from site-to-site: 2500 m
  Formation temperature: 78° C.
  Well diameters: 7" casing, 6⅛" laterals
  Baseload operation: While in baseload operation, the outlet well pressure was 395 kPag and the temperature was 51° C.
Procedure and Results:
A higher density composition was added at the inlet well while undergoing normal circulation at a constant flow rate. The slug of higher density fluid resulted in gravitational potential energy being converted to excess pressure at the outlet well, up to 900 KPag, which can be used for mechanical work or converted to electricity via a turbine. When the higher density slug travels up the outlet well, the outlet pressure falls and a pump is required to maintain circulation, hence storing the electrical energy required for the pump as gravitational potential energy. In this particular test, the higher density fluid is miscible with the lower density fluid, and no immiscible spacers or separation or fluid handling equipment was used. The fluids slowly mix over several circulation cycles and the density difference between the two fluids eventually equalizes. Therefore, there is a declining effect over time which can be mitigated by injecting new slugs or pills of high density or separating the fluids at the surface.

Example 2

Parameters:
  Well geometry: L shaped wellbore with horizontal laterals (90° angle with respect to inlet wellbore vertical axis)
  Total vertical depth (TVD): 4500 m
  Length of lateral wellbores: 6000 m
  Number of laterals: 12
  Temperature gradient: 30° C./km
  Inlet well temperature: 20° C.
Procedure and Results:
Heavy fluid (e.g., the second working fluid) is circulated in the well. The heavy fluid increases the outlet well pressure. This extra pressure can be converted into useful work using a turbine. Pelton turbine converts fluid flow (kinetic energy) and pressure (pressure potential energy) into rotational motion of the turbine and into electricity via a generator. To estimate the electricity generation potential due to gravity storage, a calculation of power generation using excess pressure and base case flow rate is required. Power Generated=Generator efficiency×Turbine efficiency×Working pressure (MPa)×Flow Rate (kg/s). Power Consumed=Required Pressure (MPa)×Flow Rate (kg/s)×1/Pump Efficiency. As the flow rate increases, the amount of thermosiphon decreases. Higher flow rate delivers larger amount of thermal duty from the loop. A pump can be required to provide sufficient pressure to increase flow rate beyond capabilities of thermosiphon.

Assumptions:
During discharge, the system operates at a maximum flow-rate of the base case, 67.4 kg/s (242.5 m3/hr). Flow rate for charging mode is kept consistent with discharge (67.4 kg/s). Flow rate for the charging mode can be optimized to achieve desired loop runtime. For example: if 17.6 tons of heavy fluid is added, the additional generated power through a turbine is 169 kW, and pump power required to return heavy fluid back to surface is 225 kW (vs. 19.3 MW continuous thermal generation ~3.85 MW electrical power, assuming 20% ORC Efficiency). System can be optimized by adding another batch of heavy fluid once the first batch enters the lateral well section (Travel time in vertical and lateral at 67.4 kg/s is 0.7 hr and 10.9 hr, respectively). Round trip efficiency is equal to the product of generator, turbine, and pump efficiencies. If all units were 100% efficient, storage would be lossless.
Round trip efficiency is 75%, calculated as:

$$\eta = \frac{P_{out}}{P_{in}} = \frac{Q_{discharge} t_{discharge}}{Q_{charge} t_{charge}} = \frac{169 \text{ kW} * 0.7 \text{ hr}}{225 \text{ kW} * 0.7 \text{ hr}} = \frac{118 \text{ kWh}}{158 \text{ kWh}} = 75\%$$

Example 3

Parameters:
  Well geometry: L shaped wellbore with horizontal laterals (90° angle with respect to inlet wellbore vertical axis)
  Total vertical depth (TVD): 4500 m
  Length of lateral wellbores: 6000 m
  Number of laterals: 12
  Temperature gradient: 30° C./km
  Inlet well temperature: 20° C.
Procedure and Results:
Another way to utilize gravity storage is to take advantage of increased thermosiphon pressure to boost flow rate during the discharge cycle. Pump requirements would be analogous to Example 2. Utilization of thermosiphon pressure to boost flow rate results in a significant uplift in the produced thermal duty (FIG. 6). However as the flow rate is increases, the circulation time decreases, reducing the overall flow cycle duration (FIG. 7). While the first batch of heavy fluid is making its way through the (flat) lateral section, additional batches of heavy fluid can be added to prolong the duration of the discharge cycle. A new batch can be added as soon as the prior batch enters the lateral section (with the assumed well construction design, up to the maximum of 15 gravity pills can be in the loop at the same time).
Operational Assumptions:
System operates at the maximum thermosiphon during discharge cycle. System operates at a base case (max. thermosiphon) rate during charge cycle. For example: if 17.6 tons of heavy fluid are added, maximum flow rate supported increases to 466.7 m3/hr (up from 242.5 m3/hr for base case). This increase in the flow rate results in increase in thermal duty to 37.1 MWth, up from 19.3 MWth (7.4 and 3.9 MWe respectively, assuming ORC efficiency of 20%). Pump power required to return heavy fluid back to surface at 242.5 m3/hr is 225 kW. The system can be optimized by adding another batch of heavy fluid once the first batch enters lateral well section (travel time in vertical and lateral at 466.7 m3/hr is 0.36 hr and 5.66 hr, respectively). Due to the amount energy being added by the surrounding rock, round trip efficiency number is not meaningful.

Example 4

Parameters:
  Well geometry: L shaped wellbore with horizontal laterals (90° angle with respect to inlet wellbore vertical axis)
  Total vertical depth (TVD): 4500 m
  Length of lateral wellbores: 6000 m
  Number of laterals: 12
  Temperature gradient: 30° C./km
  Inlet well temperature: 20° C.
Procedure and Results:
If the heavy fluid has a coefficient of thermal expansion higher than water the resulting effect is increased thermosiphon. Water has a thermal expansion coefficient of $210\times 10^{-6}$ C.$^{-1}$ at 20° C. For example, if β can be increased by 2 orders of magnitude from that of water (e.g., from about 0.0002568 to 0.02568 1/° C.), no pump would be required to bring the heavy fluid back up to surface.

Example 5

Parameters:
  Well geometry: L shaped wellbore with inclined or slanted laterals (20° angle with respect to inlet wellbore vertical axis)
  Total vertical depth (TVD): 7319 m
  Length of lateral wellbores: 6000 m
  Number of laterals: 12
  Temperature gradient: 30° C./km
  Inlet well temperature: 20° C.
Procedure and Results:
Heavy fluid continues to provide increased pressure while the fluid travels down in the laterals as well as in the vertical section. As some of the previous cases, pump is required to return the heavy fluid back to the surface. The design of the wellbore as shown in FIG. 8 provides significant uplift to the production of base case thermal duty and allows to operate at higher inlet temperature. Gravity storage allows to boost production rate and further improve generation of thermal duty.

Although the above detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A method, comprising:
   flowing, in a closed loop geothermal well residing in a target subterranean zone, a first heat transfer working fluid from a surface inlet of the geothermal well to a downhole location of the geothermal well;
   flowing, in the geothermal well, a second working fluid from the surface inlet to the downhole location of the geothermal well, the second working fluid residing upstream of the first heat transfer working fluid, the second working fluid comprising a fluid density greater than a fluid density of the first heat transfer working fluid;
   circulating, in the geothermal well, the second working fluid pushing, with the second working fluid, the first heat transfer working fluid toward a surface outlet of the geothermal well; and
   collecting energy from the mobilized first heat transfer working fluid received at the surface outlet of the geothermal well.

2. The method of claim 1, wherein the geothermal well comprises: (i) a surface inlet wellbore extending from the surface inlet to the target subterranean zone, (ii) a surface outlet wellbore extending from the surface outlet to the target subterranean zone, and (iii) a deviated wellbore fluidly coupled to and interconnecting the surface inlet wellbore to the surface outlet wellbore, the deviated wellbore residing in the target subterranean zone, and circulating the second working fluid comprises flowing the second working fluid from the surface inlet wellbore to the deviated wellbore and from the deviated wellbore to the surface outlet wellbore, pushing the first heat transfer working fluid from the deviated wellbore to the surface outlet of the geothermal well.

3. The method of claim 1, wherein the second working fluid comprises a thermal expansion coefficient equal to or greater than a thermal expansion coefficient of the first fluid, and flowing the second working fluid comprises flowing the second working fluid in the geothermal well such that the second working fluid expands, when absorbing heat from the target subterranean zone, in the geothermal well to increase a flow rate of the first heat transfer working fluid at the surface outlet of the geothermal well.

4. The method of claim 1, wherein the first heat transfer working fluid is water and the second working fluid comprises a thermal expansion coefficient that is one or more orders of magnitude greater than the thermal expansion coefficient of water.

5. The method of claim 2, wherein the geothermal well further comprises a plurality of deviated wellbores fluidly coupled to and extending from a common downhole end of the surface inlet wellbore to a common downhole end of the surface outlet wellbore, each of the plurality of deviated wellbores residing in the target subterranean zone and each comprising: (i) a first lateral wellbore extending from the downhole end of the surface inlet wellbore to a downhole junction, and (ii) a second lateral wellbore extending from the downhole end of the surface outlet wellbore to the downhole junction, and circulating the second working fluid comprises flowing the second working fluid from the surface inlet to the downhole junction and from the downhole junction to the surface outlet.

6. The method of claim 5, wherein the respective first lateral wellbores reside above the respective second lateral wellbores, each of the respective first and second lateral wellbores being slanted such that the downhole junction resides at a depth greater than a depth of the downhole end of the surface inlet wellbore.

7. The method of claim 1, further comprising, after flowing the second working fluid:
   flowing, in the closed loop geothermal well, a third heat transfer working fluid from the surface inlet to the downhole location and with the third heat transfer working fluid residing upstream of the second working fluid, the third heat transfer working fluid comprising a fluid density greater than the fluid density of the first heat transfer working fluid; and
   circulating, in the closed loop geothermal well, the third heat transfer working fluid pushing, with the third heat transfer working fluid, the second and first heat transfer working fluids toward the surface outlet of the closed loop geothermal well.

8. The method of claim 1, wherein the closed loop geothermal well comprises a controller electrically coupled to a pump configured to circulate the first and second working fluids in the geothermal well, the controller configured to change, based on an energy demand of an electrical grid associated with an intermittent energy source, a flow rate of the pump, changing a flow rate of the first and second working between a charging cycle that comprises lifting the second working fluid from a downhole location of the geothermal well to a surface of the geothermal well, and a discharging cycle that comprises circulating the second working fluid in the geothermal well, pushing the first heat transfer working fluid toward the surface outlet of the geothermal well to collect energy from the first heat transfer working fluid.

9. The method of claim 8, wherein the pump is powered by the intermittent energy source and the controller is configured to initiate the charging cycle when the intermittent energy source meets or exceeds an energy demand of the electrical grid, and the controller is configured to supply, during the discharging cycle, the collected energy to the electrical grid to supplement an energy output of the intermittent energy source, the controller configured to initiate the discharging cycle when the intermittent energy source does not meet the energy demand of the electrical grid.

10. The method of claim 9, wherein supplementing the energy output of intermittent energy source comprises producing, together with the intermittent energy source, a dispatchable energy output for the electrical grid.

11. The method of claim 1, wherein circulating the second working fluid comprises recovering, with the first and second working fluids, heat energy from the target subterranean zone, and collecting energy comprises generating at least one of hydraulic energy, thermal energy, or mechanical energy from the mobilized first heat transfer working fluid.

12. The method of claim 1, further comprising changing, at a surface of the closed loop geothermal well, at least one of a temperature, a residency time, or a fluid density of at least one of the first heat transfer working fluid or the second working fluid to change a specified energy output of the first heat transfer working fluid at the surface outlet.

13. The method of claim 12, wherein changing the residency time comprises changing a flow rate of the second working fluid to change a time it takes the second working fluid to flow from the surface inlet to the surface outlet such that the second working fluid pushes the first heat transfer working fluid to the surface outlet during a discharging cycle based on a low energy output of an intermittent energy source associated with the geothermal well, and the second working fluid is lifted to the surface outlet by a pump powered by the intermittent energy source during a charging cycle based on a high energy output of the intermittent energy source associated with the geothermal well.

14. The method of claim 1, wherein the first heat transfer working fluid is immiscible with the second working fluid or the geothermal well comprises an immiscible pill disposed between and immiscible with the first heat transfer working fluid and the second working fluid.

15. The method of claim 1, wherein the closed loop geothermal well comprises at least one of: (i) an L shaped wellbore comprising a surface directional inlet wellbore and a surface directional outlet wellbore, the surface directional inlet wellbore comprising a first heel and a first toe disposed in the subterranean zone and the surface directional outlet wellbore comprising a second heel and a second toe, the second toe fluidly coupled, at a common downhole joint of the geothermal well, to the first toe such that, in side view, the two directional wellbores form the L shaped wellbore, (ii) a U shaped wellbore comprising a surface inlet wellbore extending from the surface inlet to the subterranean zone, a surface outlet wellbore spaced from the surface inlet wellbore and extending from the surface outlet to the subterranean zone, and an interconnecting wellbore extending between and fluidly coupled to the surface inlet and the surface outlet and forming, in side view with the surface inlet wellbore and the surface outlet wellbore, the U shaped wellbore, or (iii) a single wellbore comprising a wellbore string disposed within the single wellbore and defining an annulus with a wall of the single wellbore, the annulus defining the surface inlet and the wellbore string defining the surface outlet.

16. The method of claim 15, wherein the geothermal well is the L shaped wellbore, the first and second heels being open hole and a section of each wellbore between the respective heel and the respective toe being open hole and comprising a substantially impermeable interface between each wellbore and the earth of the subterranean zone surrounding each wellbore.

17. The method of claim 1, further comprising, before flowing the first heat transfer working fluid:
   flowing, in the geothermal well, a sealant in the closed loop geothermal well; and
   forming, by circulating the sealant in the geothermal well, a thermally conductive interface between the geothermal well and the earth at the subterranean zone surrounding the geothermal well, the thermally conductive interface being substantially impermeable to fluids while at least a portion of the well is open hole;
   wherein circulating the second working fluid comprises thermally charging the second working fluid through exposure, through the thermally conductive interface, to the target subterranean zone.

18. The method of claim 1, further comprising a plurality of closed loop geothermal wells residing in the target subterranean zone or a different subterranean zone each of the plurality of closed loop geothermal wells comprising a respective surface inlet and a respective surface outlet, the method further comprising:
   flowing, in each geothermal well, a respective first heat transfer working fluid from the surface inlet of each geothermal well to a downhole location of each geothermal well;

flowing, in each geothermal well, a respective second working fluid from the surface inlet of each geothermal well to a downhole location of each geothermal well, the respective second working fluid residing upstream of the respective first heat transfer working fluid, the respective second working fluid comprising a fluid density greater than a fluid density of the respective first heat transfer working fluid;

circulating, in each geothermal well, the respective second working fluid pushing, with the respective second working fluid, the respective first heat transfer working fluid toward the surface outlet of each geothermal well; and collecting energy from the respective mobilized first heat transfer working fluid received at the surface outlet of each geothermal well.

19. The method of claim 18, wherein collecting the energy comprises collecting a selectively variable energy from each of the respective mobilized first heat transfer working fluids.

20. The method of claim 18, wherein collecting energy comprises amalgamating the collected energy from each of the respective mobilized first heat transfer working fluids to form an energy output of a predetermined quantity.

21. The method of claim 18, where circulating the respective second working fluid of one of the plurality of geothermal wells comprises circulating, with a pump powered with the collected energy of another of the plurality of geothermal wells, the respective second working fluid in the respective geothermal well.

22. A method of normalizing irregular electrical supply and demand from an electrical grid, the method comprising:
generating electrical energy in accordance with the method of claim 1; and
supplying the electrical grid with the generated electrical energy at a predetermined time to coincide with periods of increased demand on the grid.

23. A geothermal system comprising:
a closed loop geothermal well comprising:
a surface inlet wellbore,
a surface outlet wellbore, and
an interconnecting wellbore fluidly coupled to and interconnecting the surface inlet wellbore to the surface outlet wellbore, the interconnecting wellbore residing in a target geothermal subterranean zone;
a first heat transfer working fluid residing inside and configured to circulate in the geothermal well; and
a second working fluid configured to circulate in the geothermal well from the surface inlet wellbore to the surface outlet wellbore, the second working fluid residing upstream of the first heat transfer working fluid and the second working fluid comprising a fluid density greater than a fluid density of the first heat transfer working fluid;
wherein circulating the second working fluid comprises pushing, with the second working fluid, the first heat transfer working fluid toward a surface outlet of the surface outlet wellbore to collect energy from the mobilized first heat transfer working fluid received at the surface outlet.

24. A power production system, comprising:
an electrical grid;
an intermittent power production source electrically coupled to the electrical grid;
a closed loop geothermal system electrically coupled to the electrical grid, the closed loop geothermal system comprising:
a geothermal well comprising a surface inlet and a surface outlet,
a heat exchanger fluidly coupled to the surface outlet and electrically coupled to the electrical grid, the heat exchanger configured to output electricity generated by movement of a first heat transfer working fluid pushed by a second working fluid circulated, in the geothermal well, downhole to convert a gravitational potential energy of the second working fluid into kinetic energy of the first heat transfer working fluid, the second working fluid comprising a greater density than the first heat transfer working fluid and residing upstream of the first heat transfer working fluid; and
a controller operatively coupled to the electrical grid, the intermittent power production source, and the closed loop geothermal system, the controller configured to determine, based on a power output of the intermittent power production source, a power requirement of the electrical grid for a selected period of time and configured to switch the closed loop geothermal system between charging cycles and discharging cycles to provide, together with the intermittent power production source, a dispatchable energy output to the electrical grid.

* * * * *